(12) United States Patent
Reed

(10) Patent No.: US 9,301,365 B2
(45) Date of Patent: Mar. 29, 2016

(54) LUMINAIRE WITH SWITCH-MODE CONVERTER POWER MONITORING

(71) Applicant: Express Imaging Systems, LLC, Seattle, WA (US)

(72) Inventor: William G. Reed, Seattle, WA (US)

(73) Assignee: Express Imaging Systems, LLC, Renton, WA (US)

( * ) Notice: Subject to any disclaimer, the term of this patent is extended or adjusted under 35 U.S.C. 154(b) by 315 days.

(21) Appl. No.: 14/074,166

(22) Filed: Nov. 7, 2013

(65) Prior Publication Data

US 2014/0159585 A1    Jun. 12, 2014

Related U.S. Application Data

(60) Provisional application No. 61/723,675, filed on Nov. 7, 2012.

(51) Int. Cl.
*H01J 1/60*        (2006.01)
*H05B 33/08*     (2006.01)

(52) U.S. Cl.
CPC .......... *H05B 33/089* (2013.01); *H05B 33/0815* (2013.01); *Y02B 20/346* (2013.01)

(58) Field of Classification Search
CPC .......... H05B 33/0887; H05B 33/0815; H05B 33/089
USPC .................. 315/130, 291, 294, 297, 210, 152
See application file for complete search history.

(56) References Cited

U.S. PATENT DOCUMENTS

| | | | |
|---|---|---|---|
| 2,745,055 A | 5/1956 | Woerdemann |
| 4,153,927 A | 5/1979 | Owens |
| 4,237,377 A | 12/1980 | Sansum |
| 4,663,521 A | 5/1987 | Maile |
| 5,086,379 A | 2/1992 | Denison et al. |
| 5,160,202 A | 11/1992 | Légaré |
| 5,161,107 A | 11/1992 | Mayeaux et al. |

(Continued)

FOREIGN PATENT DOCUMENTS

| | | |
|---|---|---|
| DE | 4001980 A1 | 8/1990 |
| EP | 1 734 795 A1 | 12/2006 |

(Continued)

OTHER PUBLICATIONS

Japanese Office Action, dated Jan. 6, 2015, for corresponding Japanese Application No. 2011-536564, 6 pages.

(Continued)

*Primary Examiner* — Lincoln Donovan
*Assistant Examiner* — Thomas Skibinski
(74) *Attorney, Agent, or Firm* — Seed IP Law Group PLLC

(57) ABSTRACT

The power consumption of a switch-mode power converter can be determined based upon at least one of a converter drive signal pulse width or a converter drive signal frequency. Such power consumption can be determined using an algorithm providing a functional relationship between switch-mode power converter power consumption and at least converter drive signal pulse width or frequency. Such algorithms can be either calculated using known component values or empirically determined. Such power consumption may also be determined using store power consumption data in a data store that is indexed by at least one of the converter drive signal pulse width or frequency.

30 Claims, 8 Drawing Sheets

(56) References Cited

U.S. PATENT DOCUMENTS

| | | | |
|---|---|---|---|
| 5,230,556 | A | 7/1993 | Canty et al. |
| 5,276,385 | A | 1/1994 | Itoh et al. |
| 5,343,121 | A | 8/1994 | Terman et al. |
| 5,349,505 | A | 9/1994 | Poppenheimer |
| 5,450,302 | A | 9/1995 | Maase et al. |
| 5,561,351 | A | 10/1996 | Vrionis et al. |
| 5,589,741 | A | 12/1996 | Terman et al. |
| 5,808,294 | A | 9/1998 | Neumann |
| 5,869,960 | A * | 2/1999 | Brand .................... G01D 4/002 324/142 |
| 6,111,739 | A | 8/2000 | Wu et al. |
| 6,149,283 | A | 11/2000 | Conway et al. |
| 6,154,015 | A * | 11/2000 | Ichiba ................... H02M 3/158 323/225 |
| 6,377,191 | B1 | 4/2002 | Takubo |
| 6,612,720 | B1 | 9/2003 | Beadle |
| 6,674,060 | B2 | 1/2004 | Antila |
| 6,681,195 | B1 | 1/2004 | Poland et al. |
| 6,746,274 | B1 | 6/2004 | Verfuerth |
| 6,753,842 | B1 | 6/2004 | Williams et al. |
| 6,828,911 | B2 | 12/2004 | Jones et al. |
| 6,841,947 | B2 | 1/2005 | Berg-johansen |
| 6,902,292 | B2 | 6/2005 | Lai |
| 6,985,827 | B2 | 1/2006 | Williams et al. |
| 7,019,276 | B2 | 3/2006 | Cloutier et al. |
| 7,066,622 | B2 | 6/2006 | Alessio |
| 7,081,722 | B1 | 7/2006 | Huynh et al. |
| 7,122,976 | B1 | 10/2006 | Null et al. |
| 7,188,967 | B2 | 3/2007 | Dalton et al. |
| 7,190,121 | B2 * | 3/2007 | Rose ................. H05B 33/0818 315/129 |
| 7,196,477 | B2 | 3/2007 | Richmond |
| 7,239,087 | B2 | 7/2007 | Ball |
| 7,252,385 | B2 | 8/2007 | Engle et al. |
| 7,258,464 | B2 | 8/2007 | Morris et al. |
| 7,270,441 | B2 | 9/2007 | Fiene |
| 7,281,820 | B2 | 10/2007 | Bayat et al. |
| 7,314,291 | B2 | 1/2008 | Tain et al. |
| 7,317,403 | B2 | 1/2008 | Grootes et al. |
| 7,322,714 | B2 | 1/2008 | Barnett et al. |
| 7,330,568 | B2 | 2/2008 | Nagaoka et al. |
| 7,339,323 | B2 | 3/2008 | Bucur |
| 7,339,471 | B1 | 3/2008 | Chan et al. |
| 7,405,524 | B2 | 7/2008 | Null et al. |
| 7,438,440 | B2 | 10/2008 | Dorogi |
| 7,440,280 | B2 | 10/2008 | Shuy |
| 7,468,723 | B1 | 12/2008 | Collins |
| 7,524,089 | B2 | 4/2009 | Park |
| 7,538,499 | B2 | 5/2009 | Ashdown |
| 7,547,113 | B2 | 6/2009 | Lee |
| 7,559,674 | B2 | 7/2009 | He et al. |
| 7,564,198 | B2 | 7/2009 | Yamamoto et al. |
| 7,569,802 | B1 | 8/2009 | Mullins |
| 7,578,596 | B2 | 8/2009 | Martin |
| 7,578,597 | B2 | 8/2009 | Hoover et al. |
| 7,627,372 | B2 | 12/2009 | Vaisnys et al. |
| 7,631,324 | B2 | 12/2009 | Buonasera et al. |
| 7,633,463 | B2 | 12/2009 | Negru |
| 7,638,743 | B2 | 12/2009 | Bartol et al. |
| 7,677,753 | B1 | 3/2010 | Wills |
| 7,688,002 | B2 | 3/2010 | Ashdown et al. |
| 7,688,222 | B2 | 3/2010 | Peddie et al. |
| 7,703,951 | B2 | 4/2010 | Piepgras et al. |
| 7,746,003 | B2 | 6/2010 | Verfuerth et al. |
| D621,410 | S | 8/2010 | Verfuerth et al. |
| D621,411 | S | 8/2010 | Verfuerth et al. |
| 7,804,200 | B2 | 9/2010 | Flaherty |
| 7,834,922 | B2 | 11/2010 | Kurane |
| 7,932,535 | B2 | 4/2011 | Mahalingam et al. |
| 7,940,191 | B2 | 5/2011 | Hierzer |
| 7,952,609 | B2 | 5/2011 | Simerly et al. |
| 7,960,919 | B2 | 6/2011 | Furukawa |
| 7,983,817 | B2 | 7/2011 | Breed |
| 7,985,005 | B2 | 7/2011 | Alexander et al. |
| 8,100,552 | B2 | 1/2012 | Spero |
| 8,118,456 | B2 | 2/2012 | Reed et al. |
| 8,143,769 | B2 | 3/2012 | Li |
| 8,174,212 | B2 | 5/2012 | Tziony et al. |
| 8,334,640 | B2 | 12/2012 | Reed et al. |
| 8,344,665 | B2 | 1/2013 | Verfuerth et al. |
| 8,376,583 | B2 | 2/2013 | Wang et al. |
| 8,378,563 | B2 | 2/2013 | Reed et al. |
| 8,445,826 | B2 | 5/2013 | Verfuerth |
| 8,476,565 | B2 | 7/2013 | Verfuerth |
| 8,508,137 | B2 | 8/2013 | Reed |
| 8,541,950 | B2 | 9/2013 | Reed |
| 8,586,902 | B2 | 11/2013 | Verfuerth |
| 8,604,701 | B2 | 12/2013 | Verfuerth et al. |
| 8,749,635 | B2 | 6/2014 | Högasten et al. |
| 8,764,237 | B2 | 7/2014 | Wang et al. |
| 8,779,340 | B2 | 7/2014 | Verfuerth et al. |
| 8,866,582 | B2 | 10/2014 | Verfuerth et al. |
| 8,884,203 | B2 | 11/2014 | Verfuerth et al. |
| 8,921,751 | B2 | 12/2014 | Verfuerth |
| 2002/0084767 | A1 * | 7/2002 | Arai ......................... H02J 7/35 320/101 |
| 2003/0016143 | A1 | 1/2003 | Ghazarian |
| 2003/0184672 | A1 | 10/2003 | Wu et al. |
| 2004/0192227 | A1 | 9/2004 | Beach et al. |
| 2005/0231133 | A1 | 10/2005 | Lys |
| 2006/0014118 | A1 | 1/2006 | Utama |
| 2006/0066264 | A1 | 3/2006 | Ishigaki et al. |
| 2006/0098440 | A1 | 5/2006 | Allen |
| 2007/0032990 | A1 | 2/2007 | Williams et al. |
| 2007/0102033 | A1 | 5/2007 | Petrocy |
| 2007/0224461 | A1 * | 9/2007 | Oh ........................ G06F 1/263 429/9 |
| 2007/0225933 | A1 | 9/2007 | Shimomura |
| 2008/0018261 | A1 | 1/2008 | Kastner |
| 2008/0043106 | A1 | 2/2008 | Hassapis et al. |
| 2008/0130304 | A1 | 6/2008 | Rash et al. |
| 2008/0232116 | A1 | 9/2008 | Kim |
| 2008/0266839 | A1 | 10/2008 | Claypool et al. |
| 2009/0046151 | A1 | 2/2009 | Nagaoka et al. |
| 2009/0058320 | A1 | 3/2009 | Chou et al. |
| 2009/0160358 | A1 | 6/2009 | Leiderman |
| 2009/0161356 | A1 | 6/2009 | Negley et al. |
| 2009/0167203 | A1 | 7/2009 | Dahlman et al. |
| 2009/0195179 | A1 | 8/2009 | Joseph et al. |
| 2009/0230883 | A1 | 9/2009 | Haug |
| 2009/0235208 | A1 | 9/2009 | Nakayama et al. |
| 2009/0261735 | A1 | 10/2009 | Sibalich et al. |
| 2009/0268023 | A1 | 10/2009 | Hsieh |
| 2009/0278479 | A1 | 11/2009 | Platner et al. |
| 2009/0284155 | A1 | 11/2009 | Reed et al. |
| 2009/0315485 | A1 | 12/2009 | Verfuerth et al. |
| 2010/0001652 | A1 | 1/2010 | Damsleth |
| 2010/0052557 | A1 | 3/2010 | Van Der Veen et al. |
| 2010/0096460 | A1 | 4/2010 | Carlson et al. |
| 2010/0123403 | A1 | 5/2010 | Reed |
| 2010/0164406 | A1 | 7/2010 | Kost et al. |
| 2010/0171442 | A1 | 7/2010 | Draper et al. |
| 2010/0259193 | A1 | 10/2010 | Umezawa et al. |
| 2010/0271802 | A1 | 10/2010 | Recker et al. |
| 2010/0277082 | A1 | 11/2010 | Reed et al. |
| 2010/0295946 | A1 | 11/2010 | Reed et al. |
| 2010/0309310 | A1 | 12/2010 | Albright |
| 2011/0001626 | A1 | 1/2011 | Yip et al. |
| 2011/0006703 | A1 | 1/2011 | Wu et al. |
| 2011/0026264 | A1 | 2/2011 | Reed et al. |
| 2011/0215731 | A1 | 9/2011 | Jeong et al. |
| 2011/0221346 | A1 | 9/2011 | Lee et al. |
| 2011/0251751 | A1 | 10/2011 | Knight |
| 2011/0310605 | A1 | 12/2011 | Renn et al. |
| 2012/0001566 | A1 | 1/2012 | Josefowicz et al. |
| 2012/0019971 | A1 | 1/2012 | Flaherty et al. |
| 2012/0038490 | A1 | 2/2012 | Verfuerth |
| 2012/0119669 | A1 | 5/2012 | Melanson et al. |
| 2012/0169053 | A1 | 7/2012 | Tchoryk, Jr. et al. |
| 2012/0209755 | A1 | 8/2012 | Verfuerth et al. |
| 2012/0221154 | A1 | 8/2012 | Runge |
| 2012/0224363 | A1 | 9/2012 | Van De Ven |
| 2012/0230584 | A1 | 9/2012 | Kubo et al. |
| 2012/0262069 | A1 | 10/2012 | Reed |

(56) References Cited

U.S. PATENT DOCUMENTS

| | | |
|---|---|---|
| 2013/0033183 A1 | 2/2013 | Verfuerth et al. |
| 2013/0043792 A1 | 2/2013 | Reed |
| 2013/0049613 A1 | 2/2013 | Reed |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0163243 A1 | 6/2013 | Reed |
| 2013/0193857 A1 | 8/2013 | Tlachac et al. |
| 2013/0229518 A1 | 9/2013 | Reed et al. |
| 2013/0235202 A1 | 9/2013 | Nagaoka et al. |
| 2013/0340353 A1 | 12/2013 | Whiting et al. |
| 2014/0001961 A1 | 1/2014 | Anderson et al. |
| 2014/0078308 A1 | 3/2014 | Verfuerth |
| 2014/0097759 A1 | 4/2014 | Verfuerth et al. |
| 2014/0313719 A1 | 10/2014 | Wang et al. |
| 2015/0015716 A1 | 1/2015 | Reed et al. |
| 2015/0077019 A1 | 3/2015 | Reed et al. |

FOREIGN PATENT DOCUMENTS

| | | |
|---|---|---|
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |
| JP | 2008-177144 A | 7/2008 |
| JP | 2008-535279 A | 8/2008 |
| JP | 2010-504628 A | 2/2010 |
| KR | 2005078403 A | 8/2005 |
| KR | 10-2006-0086254 A | 7/2006 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/078854 A1 | 5/2014 |
| WS | 2014/039683 A1 | 3/2014 |

OTHER PUBLICATIONS

Reed et al., "Apparatus and Method of Operating a Luminaire," Office Action mailed Dec. 22, 2014, for U.S. Appl. No. 13/558,191, 17 pages.

Reed, "Adjustable Output Solid-State Lighting Device," Office Acton mailed Jan. 2, 2015, for U.S. Appl. No. 13/707,123, 24 pages.

Reed, "Electronic Control to Regulate Power for Solid-State Lighting and Methods Thereof," Amendment filed Dec. 15, 2014, for U.S. Appl. No. 12/619,535, 21 pages.

Reed, "Luminaire With Ambient Sensing and Autonomous Control Capabilities," Office Action mailed Dec. 17, 2014, for U.S. Appl. No. 13/786,332, 20 pages.

Reed et al., "Apparatus and Method for Schedule Based Operations of a Luminaire," Office Action mailed Mar. 2, 2015, for U.S. Appl. No. 14/552,274, 7 pages.

Reed et al., "Apparatus and Method of Operating a Luminaire," Amendment filed Mar. 19, 2015, for U.S. Appl. No. 13/558,191, 20 pages.

Reed et al., "Systems and Methods That Employ Object Recognition," Office Action mailed Feb. 9, 2015, for U.S. Appl. No. 13/411,321, 40 pages.

Reed, "Adjustable Output Solid-State Lighting Device," Amendment filed Apr. 2, 2015, for U.S. Appl. No. 13/707,123, 14 pages.

Reed, "Ambient Light Control in Solid State Lamps and Luminaires," Amendment filed Jan. 29, 2015, for U.S. Appl. No. 14/609,168, 12 pages.

Reed, "Ambient Light Control in Solid State Lamps and Luminaires," U.S. Appl. No. 14/609,168, filed Jan. 29, 2015, 77 pages.

Reed, "Low Power Photocontrol for Luminaire," U.S. Appl. No. 62/137,666, filed Mar. 24, 2015, 36 pages.

Reed, "Luminaire With Adjustable Illumination Pattern," U.S. Appl. No. 62/114,826, filed Feb. 11, 2015, 68 pages.

Reed, "Luminaire With Ambient Sensing and Autonomous Control Capabilities," Amendment filed Mar. 13, 2015, for U.S. Appl. No. 13/786,332, 23 pages.

Reed et al., "Apparatus and Method for Schedule Based Operation of a Luminaire," Office Action mailed Mar. 26, 2014, for U.S. Appl. No. 13/604,327, 10 pages.

Reed et al., "Long-Range Motion Detection for Illumination Control," Amendment filed Apr. 28, 2014, for U.S. Appl. No. 12/784,080, 20 pages.

Reed, "Apparatus and Method of Energy Efficient Illumination," Notice of Allowance mailed Apr. 11, 2014, for U.S. Appl. No. 13/943,537, 9 pages.

Reed, "Apparatus and Method of Energy Efficient Illumination Using Received Signals," Office Action mailed Apr. 23, 2014, for U.S. Appl. No. 13/085,301, 12 pages.

Reed, "Electronic Control to Regulate Power for Solid-State Lighting and Methods Thereof," Office Action mailed Mar. 26, 2014, for U.S. Appl. No. 12/619,535, 16 pages.

Reed et al., "Adjustable Output Solid-State Lamp With Security Features," Amendment filed Jun. 24, 2014, for U.S. Appl. No. 13/679,687, 11 pages.

Reed et al., "Apparatus and Method for Schedule Based Operation of a Luminaire," Amendment filed Jun. 24, 2014, for U.S. Appl. No. 13/604,327, 14 pages.

Reed et al., "Apparatus and Method for Schedule Based Operation of a Luminaire," Notice of Allowance mailed Jul. 7, 2014, for U.S. Appl. No. 13/604,327, 8 pages.

Reed et al., "Long-Range Motion Detection for Illumination Control," Notice of Allowance mailed Jun. 20, 2014, for U.S. Appl. No. 12/784,080, 7 pages.

Reed, "Apparatus and Method of Energy Efficient Illumination," U.S. Appl. No. 14/329,508, filed Jul. 11, 2014, 61 pages.

Reed, "Apparatus and Method of Energy Efficient Illumination Using Received Signals," Amendment filed Jul. 23, 2014, for U.S. Appl. No. 13/085,301, 12 pages.

Reed, "Electronic Control to Regulate Power for Solid-State Lighting and Methods Thereof," Amendment filed May 27, 2014, for U.S. Appl. No. 12/619,535, 22 pages.

Reed, "Luminaire With Atmospheric Electrical Activity Detection and Visual Alert Capabilities," Notice of Allowance mailed Jul. 1, 2014, for U.S. Appl. No. 13/786,114, 9 pages.

Extended European Search Report, dated Aug. 13, 2014, for corresponding European Application No. 09826926.9, 8 pages.

Reed et al., "Adjustable Output Solid-State Lamp With Security Features," Notice of Allowance mailed Aug. 29, 2014, for U.S. Appl. No. 13/679,687, 9 pages.

Reed et al., "Systems and Methods That Employ Object Recognition," Office Action mailed Aug. 25, 2014, for U.S. Appl. No. 13/411,321, 35 pages.

(56) References Cited

OTHER PUBLICATIONS

Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Electronic Control to Regulate Power for Solid-State Lighting and Methods Thereof," Office Action mailed Aug. 14, 2014, for U.S. Appl. No. 12/619,535, 16 pages.
"Led Backlight I/O Ports and Power Protection Circuit Design," dated May 2, 2011, retrieved Jun. 10, 2011, retrieved from http://www.chipoy.info/gadgets/led-backlight-i-o-ports-and-power-pr..., 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
International Search Report, mailed Dec. 13, 2010 for PCT/US2010/035649, 3 pages.
International Search Report, mailed Dec. 15, 2010 for PCT/US2010/035658, 3 pages.
International Search Report, mailed Dec. 28, 2010 for PCT/US2010/035651, 3 pages.
International Search Report, mailed Feb. 27, 2013 for PCT/US2012/065476, 3 pages.
International Search Report, mailed Jan. 14, 2013 for PCT/US2012/052009, 3 pages.
International Search Report, mailed Jul. 9, 2009 for PCT/US2009/043171, 5 pages.
International Search Report, mailed Jun. 21, 2010 for PCT/US2009/064625, 3 pages.
International Search Report, mailed Oct. 8, 2012 for PCT/US2012/033059, 3 pages.
International Search Report, mailed Sep. 30, 2011 for PCT/US2011/021359, 3 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Reed et al., "Adjustable Output Solid-State Lamp With Security Features," U.S. Appl. No. 61/561,616, filed Nov. 18, 2011, 33 pages.
Reed et al., "Apparatus and Method for Schedule Based Operation of a Luminaire" U.S. Appl. No. 13/604,327, filed Sep. 5, 2012, 44 pages.
Reed et al., "Apparatus and Method of Operating a Luminaire," U.S. Appl. No. 13/558,191, filed Jul. 25, 2012, 84 pages.
Reed et al., "Apparatus, Method to Enhance Color Contrast in Phosphor-Based Solid State Lights," U.S. Appl. No. 61/534,722, filed Sep. 14, 2011, 53 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed et al., "Gas-Discharge Lamp Replacement," U.S. Appl. No. 61/052,924, filed May 13, 2008, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," U.S. Appl. No. 61/051,619, filed May 8, 2008, 25 pages.
Reed et al., "Low-Profile Pathway Illumination System," Notice of Allowance, dated Oct. 14, 2011, for U.S. Appl. No. 12/437,472, 9 pages.
Reed et al., "Low-Profile Pathway Illumination System," Office Action, dated May 5, 2011, for U.S. Appl. No. 12/437,472, 24 pages.
Reed et al., "Remotely Adjustable Solid-State Lamp," U.S. Appl. No. 13/875,130, filed May 1, 2013, 65 pages.
Reed et al., "Remotely Adjustable Solid-State Lamp," U.S. Appl. No. 61/641,781, filed May 2, 2012, 65 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement With Passive Cooling," U.S. Appl. No. 61/174,913, filed May 1, 2009, 29 pages.
Reed et al., "Long-Range Motion Detection for Illumination Control," U.S. Appl. No. 61/180,017, filed May 20, 2009, 32 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Apparatus and Method of Energy Efficient Illumination Using Received Signals," Office Action mailed Oct. 1, 2013, for U.S. Appl. No. 13/085,301, 11 pages.
Reed, "Electronic Control to Regulate Power for Solid-State Lighting and Methods Thereof," U.S. Appl. No. 61/115,438, filed Nov. 17, 2008, 51 pages.
Reed, "Luminaire With Atmospheric Electrical Activity Detection and Visual Alert Capabilities," U.S. Appl. No. 13/786,114, filed Mar. 5, 2013, 52 pages.
Reed, "Luminaire With Atmospheric Electrical Activity Detection and Visual Alert Capabilities," U.S. Appl. No. 61/649,159, filed Aug. 28, 2012, 52 pages.
Reed, "Luminaire With Switch-Mode Converter Power Monitoring," U.S. Appl. No. 61/723,675, filed Nov. 7, 2012, 73 pages.
Reed, "Photocontrol for Luminaire Consumes Very Low Power," U.S. Appl. No. 61/849,841, filed Jul. 24, 2013, 41 pages.
Reed, "Solid State Hospitality Lamp," U.S. Appl. No. 13/973,696, filed Aug. 22, 2013, 32 pages.
Reed, "Solid State Hospitality Lamp," U.S. Appl. No. 61/692,619, filed Aug. 23, 2012, 32 pages.
Reed, "Solid State Lighting, Drive Circuit and Method of Driving Same," U.S. Appl. No. 13/875,000, filed May 1, 2013, 24 pages.
Reed, "Solid State Lighting, Drive Circuit and Method of Driving Same," U.S. Appl. No. 61/640,963, filed May 1, 2012, 24 pages.
Reed, "Resonant Network for Reduction of Flicker Perception in Solid State Lighting Systems," U.S. Appl. No. 61/527,029, filed Aug. 24, 2011, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Apparatus and Method of Energy Efficient Illumination," Amendment filed Apr. 4, 2013, for U.S. Appl. No. 12/784,091, 15 pages.

(56) References Cited

OTHER PUBLICATIONS

Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," U.S. Appl. No. 13/943,537, filed Jul. 16, 2013, 67 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," U.S. Appl. No. 61/346,263, filed May 19, 2010, 67 pages.
Reed, "Electronic Control to Regulate Power for Solid-State Lighting and Methods Thereof," U.S. App. No. 61/154,619, filed Feb. 23, 2009, 62 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "Luminaire With Ambient Sensing and Autonomous Control Capabilities," U.S. Appl. No. 13/786,332, filed Mar. 5, 2013, 86 pages.
Reed, "Luminaire With Ambient Sensing and Autonomous Control Capabilities," U.S. Appl. No. 61/728,150, filed Nov. 19, 2012, 83 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion mailed Sep. 30, 2011 for PCT/US2011/021359, 3 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Feb. 27, 2013, for PCT/US2012/065476, 8 pages.
Written Opinion, mailed Jan. 14, 2013 for PCT/US2012/052009, 5 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Oct. 8, 2012 for PCT/US2012/033059, 3 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature No. SLUP263, Copyright 2010, 2011, Texas Instruments Incorporated, 28 pages.
International Search Report mailed Nov. 11, 2014, for International Application No. PCT/US2014/047867, 3 pages.
Reed et al., "Systems and Methods That Employ Object Recognition," Amendment filed Nov. 21, 2014, for U.S. Appl. No. 13/411,321, 20 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination Using Received Signals," U.S. Appl. No. 14/557,275, filed Dec. 1, 2014, 92 pages.
Reed, "High Efficiency Power Controller for Luminaire," U.S. Appl. No. 14/546,354, filed Nov. 18, 2014, 33 pages.
Written Opinion mailed Nov. 11, 2014, for International Application No. PCT/US2014/047867, 5 pages.
International Search Report, mailed Nov. 19, 2013 for PCT/US2013/052092, 4 pages.
International Search Report, mailed Dec. 30, 2013 for PCT/US2013/058266, 3 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination Using Received Signals," Amendment filed Jan. 2, 2014, for U.S. Appl. No. 13/085,301, 26 pages.
Reed, "High Efficiency Power Controller for Luminaire," U.S. Appl. No. 61/905,699, filed Nov. 18, 2013, 5 pages.
Written Opinion, mailed Nov. 19, 2013 for PCT/US2013/052092, 7 pages.
Written Opinion, mailed Dec. 30, 2013 for PCT/US2013/058266, 8 pages.
International Search Report, mailed Feb. 26, 2014, for PCT/US2013/070794, 3 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," Office Action mailed Feb. 27, 2014, for U.S. Appl. No. 13/679,687, 11 pages.
Reed et al., "Long-Range Motion Detection for Illumination Control," Office Action mailed Jan. 30, 2014, for U.S. Appl. No. 12/784,080, 26 pages.
Reed, "Ambient Light Control in Solid State Lamps and Luminaires," U.S. Appl. No. 61/933,733, filed Jan. 30, 2014, 8 pages.
Reed, "Photocontrol for Luminaire Consumes Very Low Power," U.S. Appl. No. 14/158,630, filed Jan. 17, 2014, 71 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Written Opinion, mailed Feb. 26, 2014, for PCT/US2013/070794, 10 pages.

* cited by examiner

LUMINAIRE WITH SWITCH-MODE CONVERTER POWER MONITORING

BACKGROUND

1. Technical Field

The present disclosure generally relates to the field of illumination devices and, more particularly, to power monitoring of illumination devices using switch-mode power converters.

2. Description of the Related Art

Power measurement has traditionally relied upon measuring the current and voltage supplied to a load. Typical voltage measurement involves the use of an analog to digital converter. Typical current measurement involves the measurement of the voltage across a current sense resistor, or current sensing transformer, using an analog to digital converter. Because the alternating current used in many municipal, commercial, and industrial lighting systems is not supplied as a perfect sinusoid, the calculation of power is not as straightforward as a simple multiplication of the voltage and current. In practice, a digital signal processor is often employed due to the need for high speed data acquisition, noise filtering, root-mean-square conversion, and power computation. It is difficult to measure the current accurately because of the phase reversal of the AC waveform, and the need for the measurement to be "floating" relative to the power measurement system's direct current (DC) power supply. Application specific integrated circuits (ASICs) are available for the analog front end (AFE) of traditional power meters.

Automated power consumption measurement of devices powered by switch-mode type electronic converters has become an area of interest to electric utilities and others. For example, street lights using switch-mode power converters are now connected by communication networks such as 802.11 (WiFi) networks, power line carrier networks, or others. Such networks may be used by utilities and other operators to monitor the energy consumption, state of operation, and various other parameters of the various illumination devices within the network.

Switch-mode power converters can convert either a DC or rectified AC input voltage to a DC output voltage. The DC or relatively low frequency AC (e.g., 50-60 Hz) input voltage is converted to a high frequency (e.g., 40-60 kHz) pulse output. The conversion to a high frequency pulse affords two benefits. First, the physical size the transformer and capacitance in the power converter is reduced. Second, the impact of variations in the input voltage and variations in a load driven by the output voltage are minimized.

Typically, a switch-mode power converter includes an inductor and a switching device (usually a semiconductor switching device such as a multi-stage metal oxide semiconductor field effect transistor or MOSFET) coupled in series and connected to the DC or rectified AC input voltage source. A drive signal, such as a pulse width modulated signal drives the switching device to sequentially cause the storage and discharge energy in the inductor. Where the inductor is provided by a transformer primary, the transformer secondary can be coupled to the load. A capacitor and an optional inductor may be coupled across the output of the switch mode power converter to further level, filter and stabilize the DC output voltage delivered to the load.

Through the use of a semiconductor switching device, a very high efficiency can be achieved within the switch-mode power supply since small switching losses occur with high speed, low drive current semiconductor switches. By adjusting the conductive period of the switching device relative to the total operating cycle, the DC output voltage can be maintained at virtually any constant value. Feedback control is used to alter or adjust the conductive period of the switching device such that the power delivered at the output of the switch-mode power converter approximates a constant voltage or constant current even with varying power demand of the connected load or changes in line voltage. By supplying only the power needed by the load, the efficiency of the converter is further increased. With the expanding use of solid state light sources in municipal, commercial and industrial settings, the ability to accurately, efficiently, and economically measure the power consumption of such devices is increasing.

New, more efficient, approaches to improving power measurement in devices using switch-mode electronic converters are therefore desirable.

BRIEF SUMMARY

Within a solid state switch-mode power supply, a drive circuit is used to generate a control signal responsible for adjusting the conductive period of the semiconductor switching device. The drive signal provided by the drive circuit to the switching device may include a pulse width modulated or "PWM" signal in which at least one of frequency or pulse width are altered to adjust the power output of the converter. Alternatively, the drive signal provided by the drive circuit may be a constant duty cycle drive signal in which the frequency is altered to adjust the power output of the converter. Pulse width modulated signals may be characterized by either or both the pulse frequency or the pulse width. Altering the frequency of the converter drive signal alters how often the switching device in the power converter enters the conductive state. Altering the pulse width of the converter drive signal alters the duration that the switching device in the power converter remains in the conductive state. Altering either or both the frequency or the pulse width of the converter drive signal changes the power delivered to the load by the power converter. A resonant switch mode converter such as an LLC type converter alters the frequency of a constant duty cycle (e.g., an approximately 50% duty cycle) drive signal to adjust the output voltage or current and thereby the power consumption of the converter.

As used herein, the terms "converter drive signal," "converter drive signal pulse width," and "converter drive signal frequency" can refer to any type of drive or control signal or one or more respective parameters related thereto that are useful in controlling the power output of the power converter. Such signals may include drive signals of a waveform including a frequency and a pulse width. Such drive signals may include square wave converter drive signals, pulse width modulated converter drive signals, and the like.

The relationship between the converter drive circuit frequency or pulse width and power consumed by the switch-mode power converter is generally non-linear. However, the relationship between the power converter and its load may be reduced to an algorithm that is repeatable from power converter to power converter within the tolerances of the components used in building the power converter. Power consumption determination based on such relationships advantageously includes both the actual power delivered to the load as well as any parasitic power losses that occur within the switch-mode power converter. For example, in the case of an LLC switch-mode power converter a second order polynomial may be used to calculate the approximate power consumed by the converter given the converter drive circuit frequency. In situations requiring greater accuracy, an individual switch-mode power converter can be tested at a variety of converter drive signal frequencies or pulse widths to develop an empirical relationship between drive signal frequency or pulse width and switch-mode converter power consumption.

A power monitoring system may be summarized as including a power subsystem including: at least one switch-mode power converter including at least one power converter drive circuit, the switch-mode power converter electrically conductively coupled to provide an adjustable level power output to at least one solid state lighting subsystem and the power converter drive circuit to adjust the power output level of the switch-mode power supply to the at least one solid state lighting subsystem based on at least one of: a converter drive signal frequency or a converter drive signal pulse width; and a control subsystem communicably coupled to the power converter drive circuit, the control subsystem including: at least one controller that determines at least an approximation of the power consumed by the power subsystem to generate the power output to the at least one solid state lighting subsystem based at least in part on at least one of: information indicative of the converter drive signal frequency or information indicative of the converter drive signal pulse width.

The at least one controller may further generate and communicate to the power converter drive circuit a signal including the information indicative of at least one of: the converter drive signal frequency or the converter drive signal pulse width, and the determination by the at least one controller of at least an approximation of the power consumed by the power subsystem may be based at least in part on the information indicative of at least one of: the converter drive signal frequency or the converter drive signal pulse width communicated by the at least one controller to the at least one switch-mode power converter.

The at least one switch-mode power converter may further include at least one output communicably coupled to the at least one controller, the at least one output to communicate from the switch-mode power converter to the at least one controller an output signal including information indicative of at least one of: the converter drive signal frequency or the converter drive signal pulse width, and the determination by the at least one controller of at least an approximation of the power consumed by the power subsystem may be based at least in part on the information indicative of at least one of: the converter drive signal frequency or the converter drive signal pulse width communicated by the at least one switch-mode power converter to the at least one controller.

The power monitoring system may further include a housing disposed at least partially about the power subsystem and the control subsystem, wherein at least a portion of the at least one solid state lighting subsystem is disposed within the housing The control subsystem may further include at least one nontransitory storage media communicably coupled to the at least one controller.

The control subsystem may further include at least one environmental sensor communicably coupled to the at least one controller, and may provide sensor information indicative of at least one ambient environmental condition to the at least one controller. The at least one controller may determine at least the approximation the power consumed by the power subsystem to generate the power output to the at least one solid state lighting subsystem via one or more analytical relationships, the one or more analytical relationships based at least in part on the information indicative of at least one of: the converter drive signal frequency or the converter drive signal pulse width. The power subsystem may include an LLC resonant constant current converter, and the at least one controller may determine at least the approximation of the power consumed by the power subsystem to generate the power output to the at least one solid state lighting subsystem based at least in part on the information indicative of the pulse width modulated signal frequency or the frequency of a constant duty cycle drive signal provided to the converter. The power subsystem may include a constant frequency flyback converter, and the at least one controller may determine at least the approximation of the power consumed by the power subsystem to generate the power output to the at least one solid state lighting subsystem based at least in part on the information indicative of the converter drive signal pulse width. The power subsystem may include a variable frequency flyback converter, and the at least one controller may determine at least the approximation of the power consumed by the power subsystem to generate the power output to the at least one solid state lighting subsystem based at least in part on the information indicative the converter drive signal frequency and the converter drive signal pulse width.

The control subsystem may further include at least one communications interface communicably coupled to the at least one controller, and the at least one controller may further communicate to the at least one communications interface at least one output signal including information indicative of the power consumed by the power subsystem to generate the power output to the at least one solid state lighting subsystem.

The at least one controller may further compare information indicative of at least one of: the converter drive signal frequency or the converter drive signal pulse width with at least one defined alert threshold stored in a nontransitory storage media communicably coupled to the at least one controller; and may communicate to the at least one communications interface a signal including information indicative of an alert condition when at least one of: the converter drive signal frequency or the converter drive signal pulse width falls outside the at least one defined alert threshold.

A method to determine the power consumed by a power subsystem including a switch-mode power converter and a power converter drive circuit, the switch-mode power converter electrically conductively coupled to a solid-state lighting subsystem to provide an adjustable level power output to the solid state lighting subsystem based on at least one of: a converter drive signal frequency or a converter drive signal pulse width may be summarized as including determining by at least one controller communicably coupled to at least the power converter drive circuit at least an approximation of the power consumed by the power subsystem to generate the power output to the at least one solid state lighting subsystem based on information indicative of at least one of: the converter drive signal frequency or the converter drive signal pulse width.

The method may further include acquiring by the at least one controller the information indicative of at least one of: the converter drive signal frequency or the converter drive signal pulse width based at least in part on one or more signals communicated by the at least one controller to the power converter drive circuit.

The method may further include acquiring by the at least one controller the information indicative of at least one of: the converter drive signal frequency or the converter drive signal pulse width based at least in part on one or more output signals communicated by the power converter drive circuit to the at least one controller.

The method may further include comparing by the at least one controller the information indicative of at least one of: the converter drive signal frequency or the converter drive signal pulse width with at least one defined alert threshold stored in a nontransitory storage media communicably coupled to the at least one controller.

The method may further include communicating via at least one communications interface communicably coupled to the controller at least one alert signal including the information indicative of at least one of: the converter drive signal frequency or the converter drive signal pulse width when at least one of: the respective converter drive signal frequency or the respective converter drive signal pulse width falls outside the at least one defined alert threshold.

The method may further include communicating via at least one communications interface communicably coupled to the controller, a power consumption signal including information indicative of at least the approximation of the power consumed by the power subsystem to generate the power output to the at least one solid state lighting subsystem.

Determining the approximation of the power consumed by the power subsystem to generate the power output to the at least one solid state lighting subsystem may include calculating using one or more analytical relationships at least the approximation of the power consumed to generate the power output to the at least one solid state lighting subsystem based at least in part on the information indicative of at least one of: the converter drive signal frequency or the converter drive signal pulse width. Calculating using one or more analytical relationships at least the approximation of the power consumed to generate the power output to the at least one solid state lighting subsystem based at least in part on the information indicative of the converter drive signal frequency or the converter drive signal pulse width may include determining by the at least one controller one or more coefficients based at least on a number of intrinsic properties of at least one component in the power converter drive circuit; and determining at least the approximation of the power consumed to generate the power output to the at least one solid state lighting subsystem using the one or more analytical relationships, the one or more determined coefficients, and the information indicative of at least one of: the circuit converter drive signal frequency or the converter drive signal pulse width. Calculating using one or more analytical relationships at least the approximation of the power consumed to generate the power output to the at least one solid state lighting subsystem based at least in part on the information indicative of the converter drive signal frequency or the converter drive signal pulse width may include retrieving by the at least one controller one or more coefficients from a communicably coupled nontransitory storage medium; and determining at least the approximation of the power consumed to generate the power output to the at least one solid state lighting subsystem using one or more analytical relationships, the one or more retrieved coefficients, and at least one of: the converter drive signal frequency or the converter drive signal pulse width. Calculating using one or more analytical relationships at least the approximation of the power consumed to generate the power output to the at least one solid state lighting subsystem based at least in part on the information indicative of the converter drive signal frequency or the converter drive signal pulse width may include searching a data store by the at least one controller, the data store in a communicably coupled nontransitory storage medium, the data store including data values indicative of the approximation of the power consumed to generate the power output to the at least one solid state lighting subsystem. The data store may be indexed by at least one of a plurality of converter drive signal frequencies or a plurality of converter drive signal pulse widths. The at least one controller retrieves from the nontransitory storage medium a data value indicative of the approximation of the power consumed to generate the power output to the at least one solid state lighting subsystem. The retrieved value may be selected by the at least one controller based on at least one of: the information indicative of the converter drive signal frequency approximates an indexed converter drive signal frequency value in the data store or the information indicative of the converter drive signal pulse width approximates an indexed converter drive signal pulse width value in the data store.

A solid state lighting power monitoring system may be summarized as including a solid state lighting subsystem including at least one solid state light source; a power subsystem including: a switch-mode power converter electrically conductively coupled to provide a power output to the solid state lighting subsystem; and a power converter drive circuit to adjust the power output of the switch-mode power supply to the solid state lighting subsystem, the power converter drive circuit includes at least one output to communicate information indicative of at least one of: a converter drive signal frequency or a converter drive signal pulse width; and a control subsystem communicably coupled to the power converter drive circuit output, at least one nontransitory storage medium, and a communications interface, the control subsystem including at least one controller that: receives from the power converter drive circuit output information indicative of at least one of the converter drive signal frequency or the converter drive signal pulse width; and determines an approximation of the power consumed to generate the power output to the at least one solid state lighting subsystem based at least in part on the received information indicative of at least one of: the converter drive signal frequency or the converter drive signal pulse width.

The control subsystem may further include at least one environmental sensor communicably coupled to the at least one controller, and that may provide sensor data indicative of at least one ambient environmental condition to the at least one controller. The at least one controller may determine the approximation of the power consumed to generate the power output to the at least one solid state lighting subsystem via one or more analytical relationships and based at least in part on the received information indicative of at least one of: the converter drive signal frequency or the received information indicative of converter drive signal pulse width. The power subsystem may include an LLC resonant constant current power converter, the power converter drive circuit may generate an output signal that includes information indicative of the converter drive signal frequency, and the at least one controller may determine the power consumed by the power subsystem to generate the power output signal based at least in part on the received information indicative of the converter drive signal frequency. The power subsystem may include a constant frequency flyback converter, the power converter drive circuit may generate an output signal that includes information indicative of the converter drive signal pulse width, and the at least one controller may determine the power consumed by the power subsystem to generate the power output signal based at least in part on the received information indicative of the converter drive signal pulse width. The power subsystem may include a variable frequency flyback converter, the power converter drive circuit may generate an output signal that includes information indicative of the converter drive signal frequency and the converter drive signal pulse width, and the at least one controller may determine the power consumed by the power subsystem to generate the pulse width modulated power output signal based at least in part on the received information indicative of the converter drive signal frequency and the converter drive ed signal pulse width.

The at least one controller may further communicate to the communications interface at least one signal including information indicative of the approximation of the power consumed to generate the power output to the at least one solid state lighting subsystem.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known or well-documented electrical or electronic components such as full wave and half wave rectifiers, semiconductor switching devices, and filtering circuits and structures associated with luminaires, timing circuits, real time clock circuits, data look-up tables, and the like have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms "lighting," "luminous output" and "illumination" are used herein interchangeably. For instance, the phrases "level of illumination" or "level of light output" have the same meanings. Also, for instance, the phrases "illumination source" and "light source" have the same meanings.

The headings and Abstract of the Disclosure provided herein are for convenience only and do not interpret the scope or meaning of the embodiments.

Figure 1:
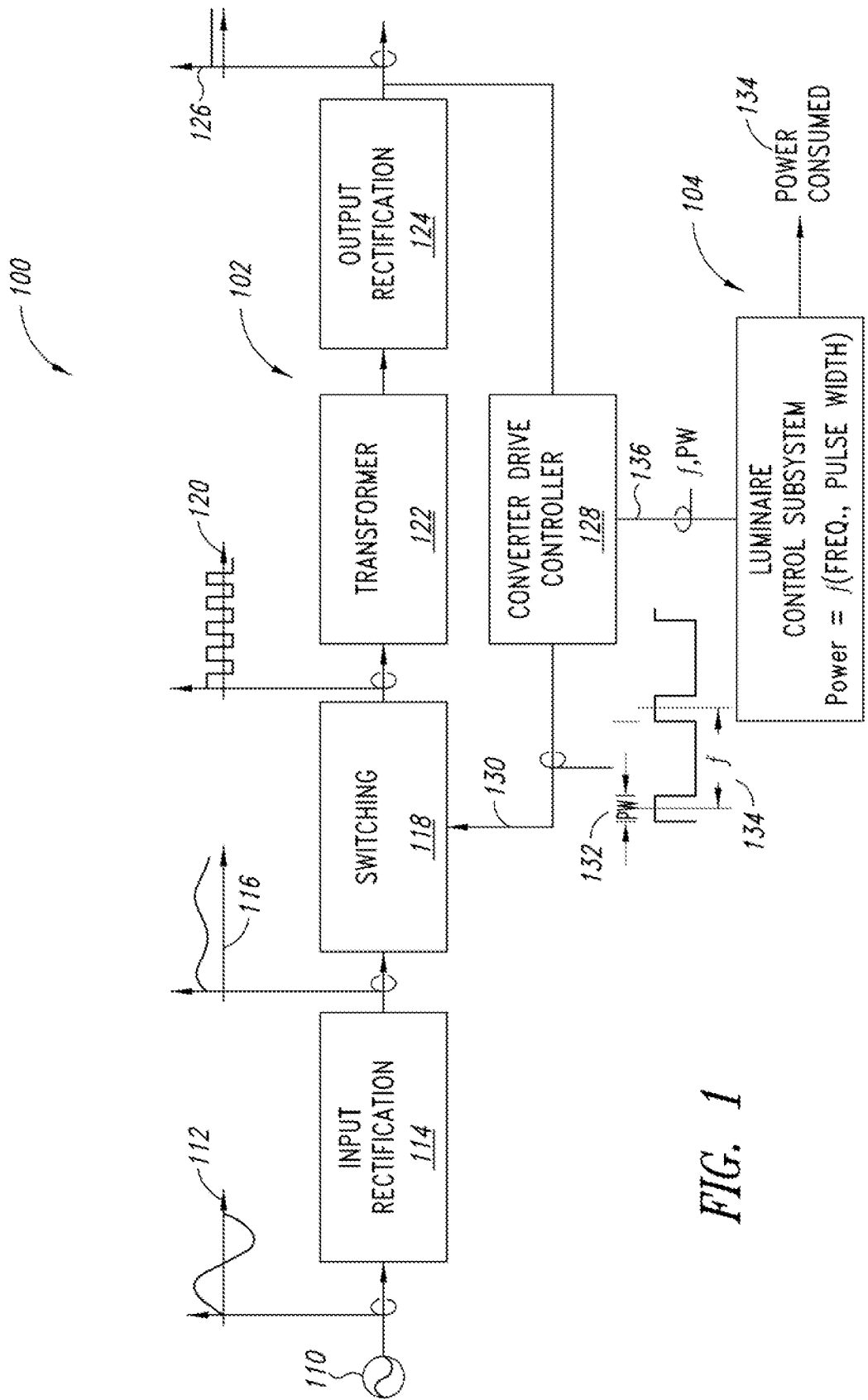
FIG. 1 is a block diagram showing a pulse width modulated (PWM) controlled switch-mode power converter with a communicably coupled luminaire control subsystem to determine the power consumption of the power converter and load, according to one non-limiting illustrated embodiment.

FIG. 1 shows an illustrative power system 100 that includes a switch-mode power supply 102 and a communicably coupled control subsystem 104 used to determine the power consumption of the switch-mode power supply based on at least one of the converter drive signal frequency or converter drive signal pulse width. Although subsequently described in the context of a solid state lighting fixture, the power system 100 can be used to power and to monitor the power consumption of any direct current powered device. Additionally, although a switch-mode power supply 102 is described in sufficient detail to provide a suitable context for the subsequent discussion, variations on the number, sequencing, type, construction, and location of the various components used within the switch-mode power supply 102 may be employed and should be considered within the scope of this disclosure.

A switch-mode power supply such as those used in luminaires equipped with solid state light sources and found in many municipal, commercial and industrial settings can be used to convert voltage supplied by an alternating current (AC) supply 110 such as a power distribution grid to a direct current (DC) constant current used to power solid state light sources. In at least some instances, the DC constant current level provided by such switch-mode power supplies can be varied or adjusted to vary or adjust the power delivered to, and consequently the luminous output of the solid state light sources in the luminaire. In at least some instances, the AC supply 110 can deliver AC power having a sinusoidal waveform 112 at a voltage of from about 110 VAC to about 600 VAC and at a frequency of from about 50 Hz to about 100 Hz.

The AC voltage is initially rectified and filtered by the switch-mode power converter 102 in an input rectification section 114. The AC voltage input to the switch-mode power converter 102 can be rectified using one or more systems or devices, for example a full-wave bridge rectifier, a two diode center tap rectifier, or a three phase bridge rectifier (for a three phase AC supply) or synchronous switching rectifier. Rectification of the input AC voltage can provide a unidirectional current output 116 at a variable, though positive, voltage. The variance in voltage level provided by the rectifier is generally referred to as "ripple" and can be minimized through the use of one or more filters coupled to the rectifier output. For example, a filter circuit comprising a one or more serially or parallel connected capacitors, resistors, inductors, or combinations thereof may be used to reduce the rectifier output voltage ripple to an acceptable level. After rectification and filtering the power has a generally DC waveform 116, ideally with little or no ripple present. Alternatively, an active Power Factor Corrector may provide a constant DC voltage while maintaining a power factor close to unity.

The filtered rectified power produced by the input rectification stage 114 is introduced to a switching section 118 where the generally DC voltage provided by the input rectification section 114 is converted to a high frequency AC or pulsed DC signal 120. In some instances, DC input power may be available, in which case the input rectifier can be eliminated, the input filters optionally eliminated, and the DC input power provided directly to the switching section 118. The switching section 118 can include any number of switching devices or systems capable of converting the DC waveform 116 provided by the input rectification section 114 to the high frequency AC or pulsed DC signal 120. In at least some instances, the switching section 118 can include one or more solid state or semiconductor switching devices such as one or more metal oxide semiconductor field effect transistors (MOSFETs) or one or more bipolar junction transistors (BJTs). In at least some instances the switching devices in the switching section 118 and consequently the waveform of the high frequency AC or pulsed DC signal 120 are controlled using the converter drive controller 128.

The frequency of the high frequency AC or pulsed DC signal 120 can, for example, range from about 10 kHz to about 200 kHz. In at least some instances, the frequency of the AC signal 120 may be altered, adjusted, or controlled by varying one or more parameters of the drive signal 130 provided by the converter drive controller 128 to the switching section 118. In at least some instances, the pulse width of the high frequency AC or pulsed DC signal 120 can be altered, adjusted, or controlled by varying one or more parameters of the drive signal 130 provided by the converter drive controller 128 to the switching section 118. In some instances both the frequency and the pulse width of the high frequency AC or pulsed DC signal 120 can be altered, adjusted, or controlled by varying one or more parameters of the drive signal 130 provided by the converter drive controller 128 to the switching section 118.

In at least some instances, the converter drive controller 128 may be equipped with diagnostic capabilities for detecting one or more switch-mode power converter 102 fault conditions. Such fault conditions may include, without limitation, an over-current condition, an open output condition, or a low input voltage condition. In such instances, upon detecting a defined fault condition, the converter drive controller 128 may cease emitting pulse width modulated drive signal 130 pulses to the switching section 118, or may emit a drive signal having one or more unique pulse sequences, by emitting drive signal 130 pulses in a "burst" or "hiccup" mode, for example. In some implementations, the control subsystem 104 may detect such defined converter drive controller 128 error modes by detecting an irregular converter drive controller pulse frequency (e.g., detecting a drive signal frequency 134 of 0 Hz of a duration exceeding a defined time limit). Responsive to the detection of a defined converter drive controller 128 error mode, the control subsystem 104 may generate and transmit one or more alert signals, provide a visual indication of the fault (e.g., illuminate a RED fault indicator).

The high frequency AC or pulsed DC signal 120 produced by the switching section 118 is introduced to the transformer section 122. Within the transformer section 122, the voltage of the high frequency AC or pulsed DC signal 120 is adjusted to the desired output voltage or current. The high frequency AC or pulsed DC signal 120 supplied to the transformer section 122 permits the use of a physically smaller transformer to provide the output voltage or current than if the low frequency (e.g., 50-60 Hz) AC voltage input were introduced directly to the transformer section 122.

The high frequency AC signal, having passed through the transformer section 122, is supplied to the output rectification section 124 where the output power to the load is rectified and filtered to provide a stable DC voltage or current output 126. The AC output from the transformer section 122 to the output rectification section 124 may be rectified using one or more systems or devices, for example a full-wave bridge rectifier in the output rectification section 124. Rectification of the high frequency AC or pulsed DC signal 120 can provide a unidirectional current output at a variable, though positive, voltage. Ripple present in the DC output voltage or current after rectification can be minimized through the use of one or more filters coupled to the rectifier output. For example, a filter circuit comprising a one or more serially or parallel connected capacitors, resistors, inductors, or combinations thereof may be used to reduce the output rectification section 122 output voltage ripple to an acceptable level. After rectification and filtering the DC output waveform 116 is supplied to the load.

The DC output to the load can be monitored by the converter drive controller 128 and the power supplied by the DC output signal to the load adjusted to match load demand by varying one or more parameters of the high frequency AC or pulsed DC signal 120. In at least some instances, the converter drive controller can provide a pulse width modulated ("PWM") drive signal 130 to the switching devices in the switching section 118 to control either the frequency or the pulse width of the resultant high frequency AC or pulsed DC signal 120 provided to the transformer section 122. The converter drive signal provided by the converter drive controller 128 can have a variable or adjustable pulse width 132, a variable or adjustable frequency 134 or both a variable or adjustable pulse width and frequency 132, 134. For example, adjusting or varying the pulse width of the converter drive signal 130 can change the duration the switching devices in the switching section 118 remain in the conductive state. In another example, adjusting or varying the frequency of the converter drive signal 130 can change the rate at which the switching devices in the switching section 118 enter the conductive state. By adjusting how often (i.e., adjusting the frequency of the converter drive signal) or how long (i.e., adjusting the pulse width of the converter drive signal) the switching devices in the switching section 118 remain in the conductive state, the amount of power delivered to the load can be varied or adjusted to meet a varying load demand.

By measuring the pulse width 132 or frequency 134 of the converter drive signal 130, the power delivered by the switch-mode power converter 102 to the load (i.e., the power consumed by the load) may be determined. Because of the non-linear nature of the components used within the switch-mode power converter 102, the relationship between the converter drive signal 130 pulse width 132 or frequency 134 and the switch-mode power converter 102 output power is non-linear. However, based on the tolerances of the components used to assemble the switch-mode power converter 102, the relationship between the converter drive signal 130 pulse width 132 or frequency 134 and the power consumed by the switch-mode power converter 102 can be determined. Such determined power consumption advantageously includes both the actual power delivered to the load as well as any parasitic power losses that occur within the switch-mode power converter 102. The calculation of power consumption based on converter drive signal 130 pulse width 132 or frequency 134 can advantageously permit the use of an accurate, low cost device that can be readily fitted or retrofitted to switch-mode power converters used to power solid state light sources such as the light emitting diodes found in solid state luminaires.

Since both (or either) the frequency or pulse width of the converter drive signal 130 can impact the power delivered by the switch-mode power converter 102, the type of switch-mode power converter architecture used affects the converter drive signal parameter measured to determine the power consumption of the switch-mode power converter 102. For example, in the case of an LLC resonant power converter, only the converter drive signal frequency 134 is needed to calculate the total power consumed by the switch-mode power converter 102 since the converter drive signal effectively operates at a constant duty cycle (e.g., a 50% duty cycle). In the case of a constant frequency flyback converter, only the converter drive signal pulse width is used to calculate the total power consumed by the switch-mode power converter 102. In the case of a variable frequency flyback converter, both the converter drive signal frequency and the converter drive signal pulse width are used to calculate the total power consumed by the switch-mode power converter 102. In at least some instances, the luminaire control subsystem 104 can generate one or more output signals 134 at least some of which can include data indicative of the power consumed by the switch-mode power converter 102.

As used herein, the term "duty cycle" is defined as the ratio between the pulse width (which may also be variously referred to as the pulse duration or the time that the signal or output remains in an active or "ON" state) and the period of the signal or output. For example, a 100 Hz (period=0.01 seconds) signal would have a duty cycle of 50% at a pulse width of 0.005 seconds (duty cycle=0.005/0.01=0.5 or 50%). Duty cycle is the mathematical product of the pulse width and frequency of the signal or output.

The product of the converter drive signal pulse width 132 and the converter drive signal frequency 134 thus provides a converter driver signal duty cycle. A change in either the converter drive signal pulse width 132 or the converter drive signal frequency 134 will cause a proportionate change in the converter drive signal duty cycle. A change in the converter driver signal duty cycle may affect either or both the power consumption of the switch-mode power converter 102 and the power delivered to a load coupled to the switch-mode power converter 102.

Figure 2:
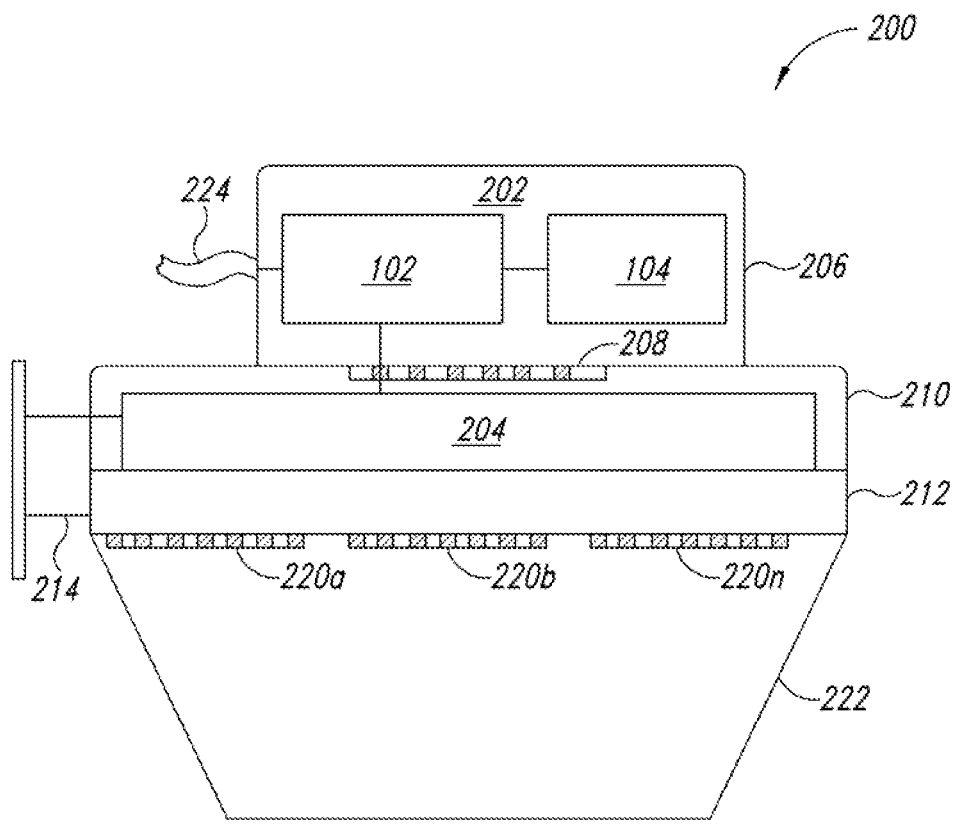
FIG. 2 is a sectional view of a luminaire including a power subsystem with a switch-mode power converter, a control subsystem including a controller to calculate the power consumed by the switch-mode power converter and load, and a lighting subsystem including a number of solid state light sources, according to one non-limiting illustrated embodiment.

FIG. 2 shows a luminaire 200 that includes a solid state lighting subsystem 204 communicably coupled to a switch-mode power converter 102 and luminaire control subsystem 104. The switch-mode power converter 102 and the control subsystem 104 are disposed within a housing 206 that is physically and electrically coupled to a lighting subsystem 204 via one or more circuits 208. The lighting subsystem 204 can be at least partially disposed in a luminaire housing 210. One or more light sources 220*a*-220*n* (collectively 220) can be partially or completely surrounded by the luminaire housing 210. In at least some instances, all or a portion light provided of the one or more light sources 220 may pass through a lens, diffuser or similar shade 222 attached to the luminaire housing 210 when exiting the luminaire 200. In at least some instances the luminaire 200 can include one or more structures or fixtures 214 useful in mounting the luminaire 200 to or suspending the luminaire 200 from a structure such as a wall, overhead structure, or light pole.

Although FIG. 1 depicts the switch-mode power converter 102 and the lighting control subsystem 104 as physically attached to the lighting subsystem 204 in some implementations the control subsystem 104 may be disposed in a location remote from the lighting subsystem 204. For example, all or a portion of the control subsystem 104 may be at least partially disposed within a housing 206 that is mounted on an exterior surface of a structure and the lighting subsystem 204 may be mounted inside the structure. When the control subsystem 104 is remote mounted, one or more wired or wireless connections may be used to power the control subsystem 104 and to communicably couple the control subsystem 104 with the lighting subsystem 204. The luminaire 200 can include one or more brackets 214 that permit the suspension or support of the luminaire 200 by a rigid structure such as that provided by a pole or building. The shade or diffuser 222 may be transparent, translucent, or opaque.

The luminaire 100 may include wiring 224 to supply power to the switch-mode power converter 102 and the lighting subsystem 204 using an external electrical power source such as an electrical distribution power grid or mains. In some instances, the one or more light sources 220 may be formed into a replaceable component, for example a plurality of individual solid state light sources or solid state light source strings formed into a bulb or similar unitary structure that physically attaches and electrically couples to the lighting subsystem 204 using a threaded, plug, or bayonet-type socket mount. Alternatively, the one or more light sources 220 may be integral with the lighting subsystem 204, particularly where the lighting subsystem 204 includes a plurality of solid-state light emitters and associated driver circuit hardware which have a relatively long operational life.

The control subsystem 104 includes electrical circuitry or electronics that control or otherwise alter or adjust the power, luminosity, luminous output, or illumination state of the lighting subsystem 204, or control one or more functions of the luminaire 200. Such functions may include, but are not limited to placing the lighting subsystem 204 in a state where the luminous output of the one or more light sources 120 are adjusted or otherwise controlled in response to the detected or expected occurrence of or more solar events. For example, the state may include increasing the output level of the light sources 220 from 0% luminous output to a level between 10% and 100% luminous output after the occurrence of a detected or expected sunset event and decreasing the output level of the light sources 220 from a level between 10% and 100% luminous output to 0% luminous output after the occurrence of a detected or expected sunrise event.

The housing 206 can include any structure suitable for internally and/or externally accommodating all or a portion of the switch-mode power converter 102 and the control subsystem 104. In some implementations, the housing may be a metallic weatherproof enclosure (e.g., a National Electrical Manufacturers Association "NEMA" type 3, 3R, or 4 enclosure, NEMA Security Luminaire or "Cobra Head" roadway lighting luminaire) or a corrosion resistant weatherproof enclosure (e.g., a NEMA 4X enclosure). For interior locations, the housing 206 may, in some instances, include a non-weather rated housing such as an open or dust-proof housing. At least a portion of the housing 206 may be substantially transparent to radio frequency (RF) or optical electromagnetic radiation. The housing 206 may include one or more features, such as one or more threaded fasteners, plugs, hooks and loops, or combinations thereof to facilitate the mechanical or physical attachment of the housing 206 to the luminaire housing 210 or other structure (e.g., a "Wall Pack" or "Shoebox").

In some instances, the electrical coupling circuit 208 linking the switch-mode power converter 102 and the control subsystem 104 to the lighting subsystem 204 can include a number of electrical contacts such as pads, prongs, spades, protrusions, or similar electrically conductive structures on at least a portion of the exterior surface of the housing 206. Such surface mount electrical connectors are particularly advantageous where the switch-mode power converter 102 and the control subsystem 104 are fitted directly to the luminaire housing 210 during manufacture or where the switch-mode power converter 102 or control subsystem 104 is retrofitted to an existing luminaire housing 210 after installation. In other instances, the electrical coupling circuit 208 can include a number of cables, each having a number of conductors extending from the housing 206. Such remote mount electrical connectors are particularly useful where the control subsystem 102 is mounted in the field at a distance from the luminaire housing 210.

The one or more light sources 220 may take a variety of forms. The light source may include one or more distinct light bulbs, lights or light emitters 220a-220n (only three (3) called out in FIG. 2). For example, the one or more light sources 220 may take the form of one or more solid state light sources, for instance an array of light emitting diodes (LEDs), organic light emitting diodes (OLEDs), or polymer light emitting diodes (PLEDs). The one or more light sources 220 do not necessarily have to be enclosed in a bulb structure. For example, the light sources may take the form of one-, two-, or even three-dimensional arrays of individual LEDs or strings of LEDs.

Light source configurations other than the individual luminaire shown in FIG. 2 may be used to equal effect. For example, the luminaire may include a plurality of directional light sources 220 mounted on a common base and operated using a common control subsystem 104. In another example, a plurality of luminaires 200 may be networked (i.e., communicably coupled) together and the luminous output of each of luminaires 200 in the network controlled as a group using a single control subsystem 104.

Figure 3:
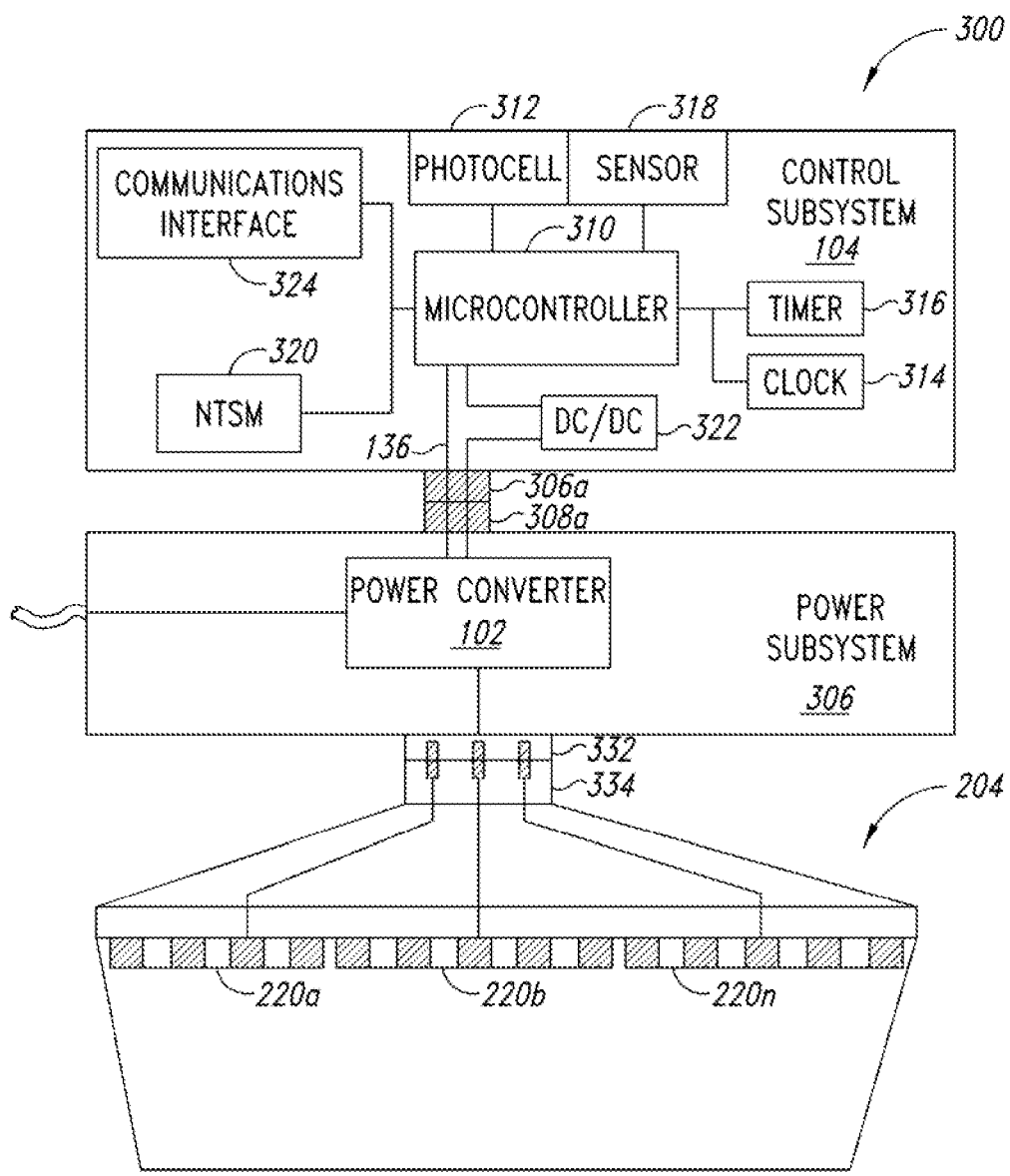
FIG. 3 is a schematic view of luminaire with a switch-mode power converter and a control subsystem including a controller to determine the power consumption of the power converter and load and a communications interface, according to one non-limiting illustrated embodiment.

FIG. 3 shows a luminaire 300 having an alternate arrangement with the control subsystem 104 communicably coupled to a power subsystem 306 that includes the switch-mode power converter 102. In turn, the power subsystem 306 is communicably coupled to the lighting subsystem 204. The luminaire 300 may be identical or similar to the luminaire 200 shown in FIG. 2 or may have a physical configuration that differs in form but is similar in function to the luminaire 200 shown in FIG. 2. The luminaire 300 may employ any number light sources 220.

The luminaire 300 includes the control subsystem 104 which may be a separate component that can be added post-manufacture, for instance in the form of a retrofit kit, to the luminaire (e.g., by "plugging in" a modular control subsystem 104 as shown in FIG. 3) or may be integral to the luminaire 300 (e.g., a control subsystem 104 that is hardwired to the power subsystem 302 and lighting subsystem 204 as shown in FIG. 3.

Notably, the control subsystem 104 includes at least one microcontroller 310. The control subsystem 104 can also optionally include a photosensitive transducer 312 to sense the varying levels (e.g., power or intensity) of one or more light conditions in the ambient environment external to the luminaire 300. Where provided, the photosensitive transducer 312 may be communicably coupled to the microcontroller 310. In at least some instances, the at least one microcontroller 310 may be used to provide all or a portion of the converter drive signal 130, for example by adjusting or otherwise controlling or limiting the pulse width 132 or frequency 134 of the converter drive signal 130 provided by the converter drive controller 128. In other instances, the at least one microcontroller 310 can be used to monitor or otherwise receive a signal including data indicative of the pulse width 132 or frequency 134 of the converter drive signal 130 provided by the converter drive controller 128.

The control subsystem 104 may additionally include a microcontroller 310 and one or more real time clock circuits 314 or one or more time-keeping circuits 316. In such instances, the microcontroller 310 may determine via one or more algorithms or via one or more data look-up or retrieval operations the time of occurrence of an expected solar event such as a sunset or sunrise event. In such instances, the microcontroller 310 may communicate a signal 136 to the converter drive controller 128 that includes data increasing the luminous output of the lighting subsystem 204 from 0% to 100% at a time coordinated with the determined expected time of occurrence of a sunset event. Such a signal 136 may increase either the pulse width 132 or frequency 134 of the converter drive signal 130 to provide the requested 100% luminous output. The microcontroller 310 may further communicate a subsequent signal 136 to the converter drive controller 128 decreasing the luminous output of the lighting subsystem 204 from 100% to 60% at a specific time (e.g., midnight). Such a subsequent signal 136 may decrease either the pulse width 132 or frequency 134 of the converter drive signal 130 to provide the requested 60% luminous output.

In some instances, one or more aspects of the lighting subsystem 204 may be controlled at least in part by the microcontroller 310 based on the occurrence of one or more events sensed by the photosensitive transducer 312. In other instances, one or more aspects of the lighting subsystem 204 may be controlled at least in part by the microcontroller 310 based on the occurrence of one or more other events sensed by a sensor or sensor assembly 318 that is communicably coupled to the microcontroller 310. For example, the luminous output of the lighting subsystem 204 may be adjusted or controlled (e.g., flashed or pulsed in a defined pattern) to alert nearby individuals of one or more alert conditions such as the presence of atmospheric electrical activity using an atmospheric lightning detector 318. In another example, operation of the lighting subsystem 204 may be adjusted or controlled at least in part based upon sensing the movement or the presence of an object or person proximate the luminaire 300 using a motion or proximity sensor 318. The sensor or sensor array 318 may be disposed in whole or in part internal or external to the control subsystem 104.

The at least one microcontroller 310 may take any of a variety of forms, for example a microprocessor, programmable gate array (PGA), application specific integrated circuit (ASIC), digital signal processor (DSP), programmable logic controller (PLC) etc. The at least one microcontroller 310 may require very limited computing power, for example an 8-bit microcontroller may be sufficient. The at least one microcontroller 310 may be communicatively coupled to receive signals directly from the at least one photosensitive transducer 312 or other sensor or sensor array 318. In some instances, the at least one microcontroller 310 can include internal nontransitory storage. Where provided, the photosensitive transducer 312 or other sensor or sensor array 318 may be directly or indirectly communicably coupled to the at least one microcontroller 310.

In some instances, a single microcontroller 310 may control one or more aspects of the operation of a plurality of wiredly or wirelessly networked luminaires 300. In such instances, the luminaires 300 in the network may be addressed and/or controlled individually, addressed and/or controlled as a plurality of sub-networks, or addressed and/or controlled as a single network. In such an arrangement, the single microcontroller 310 may transmit various signals exercising control over operation of the luminaires 300 comprising the network.

The control subsystem 104 may optionally include nontransitory storage media 320. In at least some instances, at least a portion of the nontransitory storage media 320 may wholly or partially comprise removable storage media such as secure digital (SD) or compact flash (CF) cards, universal serial bus (USB) memory sticks, or similar. The non-removable portion of the nontransitory storage media 320 may take any of a variety of forms, for example electrically erasable programmable read only memory (EEPROM), flash memory, solid state memory, memristor memory, atomic memory, or combinations thereof. The nontransitory storage media 320 may have sufficient capacity to store or otherwise retain one or more sets of machine executable instructions, one or more algorithms to calculate power consumption for the switch-mode power converter 102 in the power subsystem 306 based on converter drive signal pulse width 132 or frequency 134, or the like. In instances where the microcontroller 310 provides some or all of the data used by the switch-mode power converter 102 to generate the converter drive signal 130, the nontransitory storage media 320 may include algorithms to calculate power consumption for the switch-mode power converter 102 in the power subsystem 306 based on the data provided by the microcontroller 310 to the switch-mode power converter 102.

In some instances, the nontransitory storage media 320 may also include astronomical data such as year-long daily sunrise and sunset times at a number of latitudes, open storage for acquired data indicative of one or more solar events including data either internally generated by the control subsystem 104 or acquired from one or more external sources such as a network or handheld computing device. In some instances, the control subsystem 104 may automatically overwrite all or a portion of the data stored within the nontransitory storage media 320, for example every number N of daily cycles.

In at least some instances, the at least one nontransitory storage media 320 can store or otherwise retain a number of look-up tables or other comparable data structures containing power consumption data for the switch-mode power converter 102 communicably coupled to the control subsystem 104. In at least some instances such tables may be retained or otherwise stored at least in part on removable nontransitory storage media. For example, the nontransitory storage media 320 can store or otherwise retain power consumption data for one or more switch-mode power converters 102 indexed by converter drive signal frequency, converter drive signal pulse width, or both. In another example, the nontransitory storage media 320 can store or otherwise retain consumption data for one or more switch-mode power converters 102 indexed by one or more signal parameters of the signal 136 communicated by the microcontroller 310 to the converter drive controller 128 and used to adjust or otherwise control the converter drive signal 130 provided by the converter drive controller 128 to the switching section 118 of the switch-mode power converter 102.

The nontransitory storage media 320 can also include one or more defined converter drive signal frequency thresholds and one or more defined converter drive signal pulse width thresholds. The nontransitory storage media 320 can include one or more defined low power thresholds useful for detecting a low power deviation (e.g., a determined power consumption level less than 60% during evening hours when the microcontroller 310 is calling for 80% or higher luminous output from the luminaire 300). The nontransitory storage media 320 can include one or more defined high power thresholds useful for detecting a high power deviation (e.g., a determined power consumption greater than 25% during daylight hours when the microcontroller 310 is calling for 0% luminous output from the luminaire 300).

In at least some implementations, the microcontroller 310 can store or otherwise retain data indicative of any detected converter drive controller 128 faults in the nontransitory storage media 320 for later retrieval. For example, such data may be communicated to one or more handheld electronic devices or external networks at a time subsequent to the time of detection of the fault condition to beneficially assist in the performance of appropriate and timely remedial measures to correct the source of the fault condition.

In some instances, the at least one nontransitory storage media 320 can store or otherwise retain a number of look-up tables or other comparable data structures related to astronomical or solar event data. Such astronomical or solar event data may include sunrise and sunset times, dusk and dawn times, solar noon and solar midnight times, and the like. In at least some instances, the at least one nontransitory storage media 320 can store or contain geolocation information specific to the position or location or the intended position or location of the luminaire 300 on the surface of the Earth. Such geolocation data can include at least the latitude or other similar positioning information or coordinates sufficient to identify the location or intended location of the luminaire 300 with respect to a pole or the equator or any similar fixed geographic reference point on the surface of the Earth. In some implementations the geolocation data may include the longitude in addition to the latitude. Longitude data may be useful, for example in identifying a particular time zone (e.g., a time zone location referenced to a reference time or time zone such as coordinated universal time, UTC) in which the luminaire 300 is operating or programmed to operate. In some instances, dates and times corresponding to the conversion from daylight savings time to standard time (and vice-versa) may be stored within the nontransitory storage media 320 to permit the scheduled operation of the luminaire 300 to reflect such legislative time changes. Such geolocation, reference time, time zone, and daylight savings time data may be communicated to and stored in the nontransitory storage media 320, for example, using a portable handheld electronic device having global positioning capabilities and a communications link (wired or wireless, including RF, microwave or optical such as infrared) to the luminaire 300. Alternatively, geolocation, reference time, time zone, or daylight savings time information may be stored in a read-only portion of the at least one nontransitory storage media 320, for example when the luminaire 300 is manufactured, installed, commissioned, programmed or serviced. In another example, a GPS receiver may be used to provide geolocation, time, or date data.

In some instances, the nontransitory storage media 320 may further store or otherwise retain data representative of one or more other defined thresholds related to one or more sensed events. For example, one or more defined thresholds related to events external to the luminaire 300 such as external illumination events sensed by the photosensitive transducer 312 or other events sensed by the sensor or sensor array 318. In some instances, data representative of one or more defined thresholds indicating varying levels of electromagnetic pulse strength, electromagnetic pulse distance, or other electromagnetic characteristics associated with atmospheric electrical activity may be stored in the nontransitory storage media 320. Data representative of one or more defined thresholds indicating varying levels of optical signal strength, optical signal distance, or other optical characteristics associated with atmospheric electrical activity may be stored in the nontransitory storage media 320. Data representative of one or more defined thresholds indicating varying levels of acoustic signal strength, acoustic signal distance, or other acoustic characteristics associated with atmospheric electrical activity may be stored in the nontransitory storage media 320.

The control subsystem 104 may include one or more integrated or discrete real time clock circuits 314. For example, a real time clock implemented on integrated circuit such as the PCF2129A as manufactured by NXP Semiconductors (Eindhoven, The Netherlands) may be used in some instances. In at least some instances, the real time clock circuit 314 may be persistently powered, for example using one or more batteries, capacitors, ultracapacitors or similar energy storage devices. Other commercially available semiconductor chips providing real time clock functionality may be equally employed. The control subsystem 104 may implement a real time clock based on timing signals produced by the microcontroller 310, processor clock, or another oscillator. The control subsystem 104 may include a timer circuit 316 (e.g., a digital timing circuit or an analog timer circuit). In at least some instances, the timer circuit 316 may be persistently powered, for example using one or more batteries, capacitors, ultracapacitors or similar energy storage devices. The timer circuit 316 may produce control signals at defined periods following an occurrence of defined times as indicated by the real-time clock circuit 314 of the control subsystem 104.

As explained in detail below with reference to FIGS. 4-8, the at least one microcontroller 310 can be used to both control the luminous output of the lighting subsystem 204 and monitor the power consumption of the switch-mode power converter 102. Thus, the microcontroller 310 is in a unique position to both establish a desired luminous output of the lighting subsystem 204 and monitor the power consumption of the switch-mode power converter 102 powering the lighting subsystem 204 to confirm that the power consumption at the expected luminous output falls within a defined range of acceptability. Such also allows the creation of alarms, alerts, or similar notifications when the measured power consumption of the switch-mode power converter 102 deviates from or falls outside a defined range of acceptability based on the luminous output of the lighting subsystem 204. In operation, the microcontroller 310 provides at least one signal 136 to the converter drive controller 128. Responsive to the receipt of the signal 136 from the control subsystem 104, the converter drive controller 128 alters one or more parameters of the PWM drive signal 130 provided to the switching section 118 of the switch-mode power converter 102 to achieve the desired power output and consequently the desired luminous output from the luminaire 300.

In some instances, the microcontroller 310 can alter, adjust or control the luminous output of the lighting subsystem 204 in coordination with one or more astronomical or solar events. In one example, the luminous output of the lighting subsystem 104 may be increased to 100% at a time corresponding to determined time of occurrence of a sunset event and decreased to 0% at a time corresponding to a determined time of occurrence of a sunrise event. Machine or processor executable instructions for controlling the luminous output of the lighting subsystem in coordination with one or more solar events may be stored at least partially within a non-volatile portion of the nontransitory storage media 320.

The control subsystem 104 may include a power converter 322 that rectifies, steps down a voltage or otherwise conditions electrical power supplied to the at least one microcontroller 310, the nontransitory storage media 320 and/or other components of the control subsystem 104. In one instance, the power converter 322 may include an AC/DC converter used to step a voltage down to a first level suitable for the control electronics of the control subsystem 104. An example of such an AC/DC converter is a "capacitor dropping" type AC/DC converter including a moderately sized capacitor (e.g., 1 microfarad capacitor) and a rectifier or bridge rectifier including a capacitor and a half- or full-bridge rectifier.

The control subsystem 104 can include one or more energy storage devices (e.g., battery cells, button cells, capacitors, super- or ultracapacitors, fuel cell), used to supply power to the components of the control subsystem 104 when needed, for example in the event of loss of power from the grid or other external power source. For example, the one or more energy storage devices may supply power to the real time clock circuit 314 or the timer circuit 316 in instances where electrical power supplied by an electrical distribution grid or network is interrupted. The one or more energy storage devices may also provide sufficient power to maintain the current date, day in the solar cycle, or Julian date and the current time within the real time clock circuit 314 during the luminaire manufacturing, shipping and installation process. In at least some instances, the current time can include a local time (i.e. the time in the time zone in which the luminaire is operating or intended to operate) or a universal time such as coordinated universal time (UTC). Where a universal time is used, one or more correction factors useful in converting the universal time to a local time in which the luminaire is operating or intended to operate may be stored in the nontransitory storage media 320.

In some instances, the current time and current date may be the local time and the local date at the geographic location where the luminaire is installed or is intended for installation. Such local time and local date information may be stored within the nontransitory storage media 320 along with any local time changes (e.g., Daylight Savings time changeover dates and times), leap years, or other events affecting the local time or local date. Such current time/current date or local time/local date information may be periodically or continuously provided to or updated in the luminaire using one or more external electronic devices. For example, the current or local time or date may be periodically updated using an electronic device connected via a wired or wireless network, or a portable electronic device such as a cellular telephone, portable data assistant, tablet computer, or the like.

One or more optional wired or wireless communications interfaces 324 may be disposed within the control subsystem 104. Such communications interfaces 324 may include, but are not limited to one or more optical (e.g., infrared), wired (e.g., IEEE 802.3, Ethernet, etc.) or wireless (e.g., IEEE 802.11—WiFi®; cellular—GSM, GPRS, CDMA, EV-DO, EDGE, 3G, 4G; Bluetooth®; ZigBee®; Near Field Communications; etc.) communication interfaces. The one or more communication interfaces 324 may be communicably coupled to the at least one microcontroller 310 or the at least one nontransitory storage media 320 and used to unidirectionally or bidirectionally exchange data between the control subsystem 104 and one or more external electronic devices, systems, or networks. In some instances, the one or more communication interfaces 324 may provide the control subsystem 104 in a luminaire 300 with the ability to unidirectionally or bidirectionally communicate with the control subsystem 104 in a number of other luminaires.

Information regarding the power consumption of the switch-mode power converters 102 in each of a number of luminaires 300 in a luminaire network can be transmitted to one or more remote locations via the one or more wired or wireless communications interfaces 324. For example, power consumption data provided by each of a number of luminaires 300 may be communicated back to a central monitoring station via a power line network or a cellular network. Such advantageously allows not only the tracking of power consumption on a per luminaire basis, but also provides a wealth of data from which errant luminaires can be identified and proactive rather than reactive measures taken, potentially improving system reliability while reducing unexpected downtime and costs.

Information regarding the power consumption may also assist in identifying other failure modes within the luminaire 300. For example, a luminaire 300 equipped with a photosensitive transducer 312 will generally show a predictable power consumption pattern where maximum power is consumed during evening hours and little or no power is consumed during daylight hours. A failed photosensitive transducer 312 will result in the luminaire 300 either remaining constantly illuminated (i.e., a constant power draw) or constantly dark (i.e., no power draw). Such a deviation from the expected diurnal power consumption pattern can be identified either manually or automatically at a remote power monitoring station and appropriate corrective action taken. In another example, a luminaire 300 equipped with a Doppler motion sensor 318 and located in a commercial parking garage will generally show power consumption during the hours of operation of the commercial establishment (e.g., between 10:00 AM and 10:00 PM). Indication of power consumption during hours when the commercial establishment and the parking garage are closed may indicate either unauthorized, potentially illegal, activity or a failed motion sensor. Such errant power consumption can be identified either manually or automatically at a remote power monitoring station and appropriate corrective action taken to identify and correct the cause of the errant power consumption. In some instances, power consumption data spanning a defined period (e.g., one day, one week, one month, etc.) may be stored in the nontransitory storage media 320 for later access or retrieval via the wired or wireless communications interface using a central monitoring station or a handheld electronic device such as a cellular smart phone, personal digital assistant, handheld computer, tablet computer, laptop computer, or the like.

In some instances, the one or more wired or wireless communications interfaces 324 facilitate the transfer of data indicative of a current time, a universal time (e.g., Coordinated Universal Time, UTC), a current date, a current day of the solar cycle (e.g., day 213 of a 365¼ solar cycle), a Julian date, or combinations thereof. The one or more wired or wireless communications interfaces 324 may facilitate the transfer of data indicative of one or more sets of machine executable instructions used by the microcontroller 310. The one or more wired or wireless communications interfaces 324 may facilitate the transfer of data indicative of one or more sets of operational code such as firmware useful in supporting the operation of the control subsystem 104.

The lighting subsystem 204 includes one or more solid state light sources 220 powered by the switch-mode power converter 102. Each of the one or more solid state light sources 220 can include a single solid state light source or one or more strings of electrically coupled solid state light sources. The solid state light sources 220 can include any type of current or future solid state light source (e.g., semiconductor light-emitting diodes or "LEDs," organic light-emitting diodes or "OLEDs," or polymer light-emitting diodes or "PLEDs") able to respond to fluctuations in input power to provide a plurality of light levels. All or a portion of the number of solid state light sources 220 may be selectively replaceable, removable, or interchangeable from the lighting subsystem 204. The lighting subsystem 204 may be selectively removable or interchangeable from the luminaire 300. For example, a standard E26 or E40 screw-in connector 332 may be located on an exterior surface of the power subsystem 306 and a complimentary male bayonet type connector 334 may be disposed on an exterior surface of the lighting subsystem 204. Alternatively, the solid state light sources 220 and all or a portion of the lighting subsystem 204 may formed integrally with the power subsystem 306, the control subsystem 104, or all three subsystems may be integrally formed to provide a unitary luminaire 300.

The switch-mode power converter 102 has been previously described in detail with regard to FIG. 1. In some instances, power supplied by the switch-mode power converter 102 may flow through one or more external switches or similar circuit interrupters capable of disrupting current or power flow to all or a portion of the light sources 220. In at least some instances, the microcontroller 310 can open, close, or otherwise control the operational state of the one or more switches or similar circuit interrupters.

The switch-mode power converter 102 may be used to provide all or a portion of the power to the solid state light sources 220. In such instances, the control signal 136 provided by the microcontroller 310 to the switch-mode power converter 102 may be used to selectively alter, adjust, or control the power output or operation of the AC/DC switched mode converter. For example, an IRS2548D SMPS/LED Driver PFC+Half-Bridge Control IC as manufactured by International Rectifier Corp. (Los Angeles, Calif.) may be used to provide power to the solid state light sources 220. In some instances, the power supplied to the solid state light sources 220 and consequently the luminous output of the light sources may be based partially or entirely upon data or information included in the output signal 136 provided to the switch-mode power converter 102 by the microcontroller 310. In such instances, the presence of a low output signal (e.g., a digital "0" signal) from the microcontroller 310 may permit the flow of current to the solid state light sources 220 while the presence of a high output signal (e.g., a digital "1" signal) from the microcontroller 310 may inhibit the flow of current to the solid state light sources 220.

As used herein and in the claims, adjusting an illumination level includes turning ON a light source from an OFF state in which no light or illumination is produced to an ON state at which at least some light or illumination is produced. As used herein and in the claims, adjusting an illumination level includes turning OFF a light source from an ON state in which at least some light or illumination is produced to an OFF state at which no light or illumination is produced.

As used herein and in the claims, adjusting an illumination level also includes increasing and/or decreasing a level of light or illumination produced. Such may include adjusting an output level for any given discrete light source. Such may additionally or alternatively include adjusting a total number of light sources that are in the ON state. For example, a first and second set or strings of light sources may be used to produce a first level of light or illumination, while only the first set or string of light sources may be used to produce a second level of light or illumination. Also for example, a first number of light sources in a first set or string may be used to produce the first level of light or illumination, while a smaller number or subset of light sources in the first set or string may be used to produce the second level of light or illumination.

Figure 4:
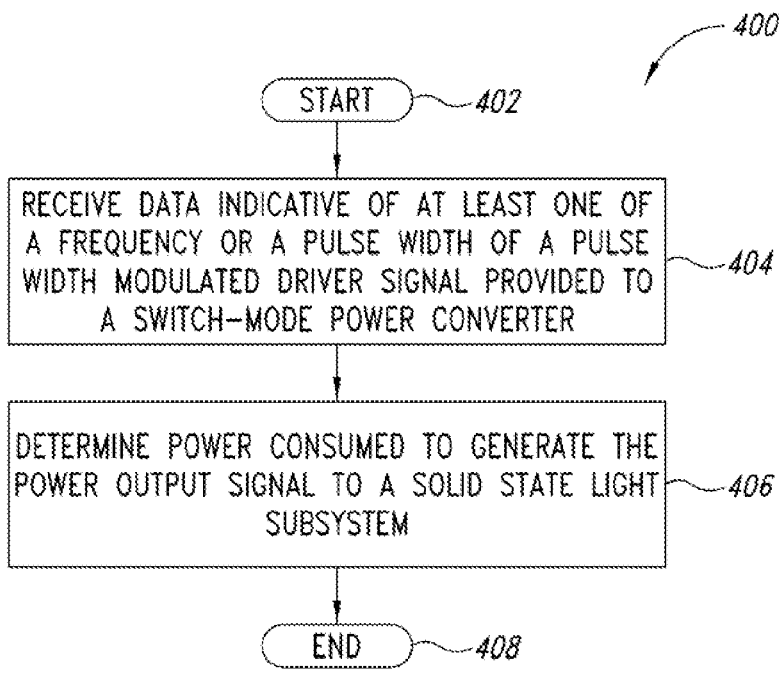
FIG. 4 is a logic flow diagram showing a high level method of calculating the power consumption of a switch-mode power converter and load using at least one of a converter drive circuit frequency or a converter drive circuit pulse width, according to one non-limiting illustrated embodiment.

FIG. 4 shows a high level method 400 of determining the power consumed by the switch-mode power converter 102 providing a power output to a solid state lighting subsystem 204. The switch-mode power converter 102 uses a converter drive signal 130 to control the switching of the solid state switches in the switching section 118. Either or both the frequency and pulse width of the converter drive signal 130 can be varied or adjusted to provide any desired power output to (and consequently any desired luminous output from) the lighting subsystem 204. The frequency and pulse width of the converter drive signal are determined by the converter drive controller 128 based on an input signal 136 provided by the luminaire control subsystem 104. The input signal 136 provided by the luminaire control subsystem 104 can variously include data indicative of a desired power output level from the switch-mode power converter 102, a desired pulse width of the converter drive signal 130, or a desired frequency of the converter drive signal 130. The method commences at 402, for example on initial application of power or turning ON of the solid state lighting subsystem 204.

At 404, the control subsystem 104 receives data indicative of at least one of the converter drive signal pulse width 132 or the converter drive signal frequency 134. In some instances, the data indicative of the converter drive signal pulse width 132 or the converter drive signal frequency 134 can be received from an external source. For example, the data indicative of the converter drive signal pulse width 132 or the converter drive signal frequency 134 can be received from the converter drive controller 128 or from a suitable transmitter that is communicably coupled to the converter drive controller 128. In other instances, the data indicative of the converter drive signal pulse width 132 or the converter drive signal frequency 134 can be received from an internal source. For example, the data indicative of the converter drive signal pulse width 132 or the converter drive signal frequency 134 can be internally generated by the microcontroller 310. Regardless of the source of the data indicative of the converter drive signal pulse width 132 or the converter drive signal frequency 134, such data may be used by the microcontroller 310 to calculate the power consumption of the switch-mode power converter 102.

At 406, using the data indicative of the converter drive signal pulse width 132 or the PWM drive signal frequency 134, the power consumption of the switch-mode power converter 102 is determined by the microcontroller 310. Advantageously, using one or more converter drive signal 136 characteristics the microcontroller 310 is able to determine the overall or total power consumption of the switch-mode power converter 102, including both the power consumed by the lighting subsystem 204 and the parasitic losses in the switch-mode power converter 102 itself.

In at least some instances, the power consumption of the switch-mode power converter 102 can be determined by the microcontroller 310 using one or more algorithms determined using appropriate values for the components forming the switch-mode power converter 102 and solid-state lighting subsystem 204. Such will allow the calculation of the power consumed by the switch-mode power converter 102 to a level of accuracy determined by the tolerance of the components used in the switch-mode power converter 102. Such algorithms may be determined and stored in the nontransitory storage medium 320 at the time of manufacture of the luminaire 300. Such algorithms may be autonomously determined at least in part by the microcontroller 310 and stored in the nontransitory storage media 320 subsequent to the manufacture of the luminaire 300. Such algorithms may be manually or autonomously determined and transmitted using an external electronic device communicably coupled to the microcontroller 310.

In other instances, in particular where a greater degree of accuracy is desirable, such algorithms may be empirically determined either at the time of manufacture of the luminaire 300 or subsequent to the installation of the luminaire 300. For example, the algorithms can be determined by applying on a bench-top various known converter drive signals 130 to the switch-mode power converter 102 and measuring the power delivered to the load by the switch-mode power converter 102 for each of the various converter drive signals 130. In another example, the algorithms can be determined by applying in the field various known converter drive signals to the switch-mode power converter 102 and measuring the power delivered to the load by the switch-mode power converter 102 for each of the various converter drive signals 130.

In yet other instances, the power consumption of the switch-mode power converter 102 can be determined by the microcontroller 310 by retrieving one or more values indicative of the switch-mode power converter 102 power consumption from one or more data stores, data tables, look-up tables, or the like. In at least some instances, the one or more data tables, look-up tables, or the like can be indexed by the converter drive signal pulse width 132, the converter drive signal frequency 134 or both. In at least some instances, the one or more data tables, look-up tables, or the like can be stored or otherwise retained in the nontransitory storage medium 320. The method 400 concludes at 408.

Figure 5:
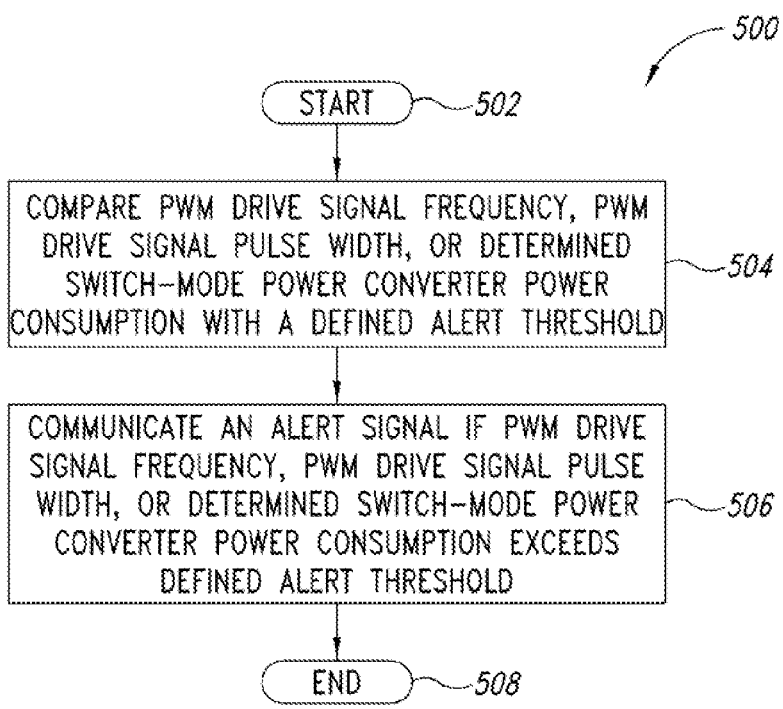
FIG. 5 is a logic flow diagram showing a high level method of alarming a detected fault condition on a switch-mode power converter using at least one of a converter drive circuit frequency or a converter drive circuit pulse width, according to one non-limiting illustrated embodiment.

FIG. 5 shows a high level method 500 of generating or otherwise providing an alert message if at least one of the converter drive signal pulse width 132, the converter drive signal frequency 134, or the determined switch-mode power converter 102 power consumption exceeds one or more defined thresholds. In at least some instances, the alert message may be generated by the microcontroller 310 and communicated via the wired or wireless communications interface 324 to one or more remote monitoring devices. In other instances, the alert message may be generated based at least part on information or data transmitted by the microcontroller 310 at one or more remote monitoring stations. The method commences at 502, for example in response to a call or interrupt from another routine or method.

At 504, at least one of the converter drive signal pulse width 132, the converter drive signal frequency 134, or the determined power consumption of the switch-mode power converter 102 is compared with one or more defined alert thresholds. In at least some instances, the microcontroller 310 can perform the comparison with the one or more defined alert thresholds. In other instances, a network device can perform the comparison with the one or more defined alert thresholds. In yet other instances, a communicably coupled handheld electronic device can perform the comparison with the one or more defined alert thresholds. The one or more defined alert thresholds may be based on the magnitude of a deviation from a defined value. For example, if a pulse width of "X" is known to provide a power output of "Y" for a given switch-mode power converter 102, when the target power output is "Y" an alert may be signaled if the pulse width exceeds a value of "X+/−ΔX" where "ΔX" is the defined maximum permissible pulse width deviation from "X." Similarly, if a desired power output from the switch-mode power converter 102 is "A" an alert may be signaled if the measured power output from the switch-mode power converter 102 is greater or less than "A+/−ΔA" where "ΔA" is the defined maximum power output permissible deviation from "A."

In at least some instances, some or all of the defined alert thresholds may be stored or otherwise retained in the nontransitory storage medium 320. In at least some instances, some or all of the defined alert thresholds may be stored in a nontransitory storage remote from the luminaire 300. For example, some or all of the defined alert thresholds may be stored in a nontransitory storage medium onboard a portable electronic device that is communicably coupled to the microcontroller 310 via the wired or wireless communications interface 324. In another example, some or all of the defined alert thresholds may be stored in a remotely accessible nontransitory storage medium such as at a remote monitoring station or in a network based storage (e.g., in the "cloud").

In at least some instances, the comparison between at least one of converter drive signal pulse width 132, the converter drive signal frequency 134, or the determined switch-mode power converter 102 power consumption and the defined alert threshold may be performed by the microcontroller 310 using one or more locally or remotely acquired defined alert thresholds. In other instances, a different controller or processor, such as a remote monitoring processor or a processor in an external handheld electronic device, may perform the comparison between the at least one of converter drive signal pulse width 132, the converter drive signal frequency 134, or the determined switch-mode power converter 102 power consumption and the defined alert threshold.

At 506, an alert notification or message can be generated to provide a notification that at least one of the converter drive signal pulse width 132, the converter drive signal frequency 134, or the determined power consumption of the switch-mode power converter 102 has exceeded one or more defined alert thresholds. Such notification may be generated by the microcontroller 310 and transmitted to one or more external devices via the communications interface 324. Such notifications may be generated by a networked external device such as a central monitoring station. Such notifications may also be generated by a communicably coupled handheld or portable electronic device. The autonomous generation of notification or alert messages based on defined alert thresholds advantageously facilitates the autonomous identification of luminaires 300 either individually or within a network that are not performing within one or more defined operational boundaries. Such luminaires may include luminaires installed in remote locations. Such monitoring and autonomous alert generation capabilities can be advantageously included on a luminaire 300 installed on a rural barn or similar outbuilding. By monitoring the luminaire remotely, the equipment and labor expense incurred in monitoring the remote luminaire and detecting trouble with the control subsystem 104, the power subsystem 102, or the lighting subsystem 204 can be minimized. The method 500 concludes at 508.

Figure 6:
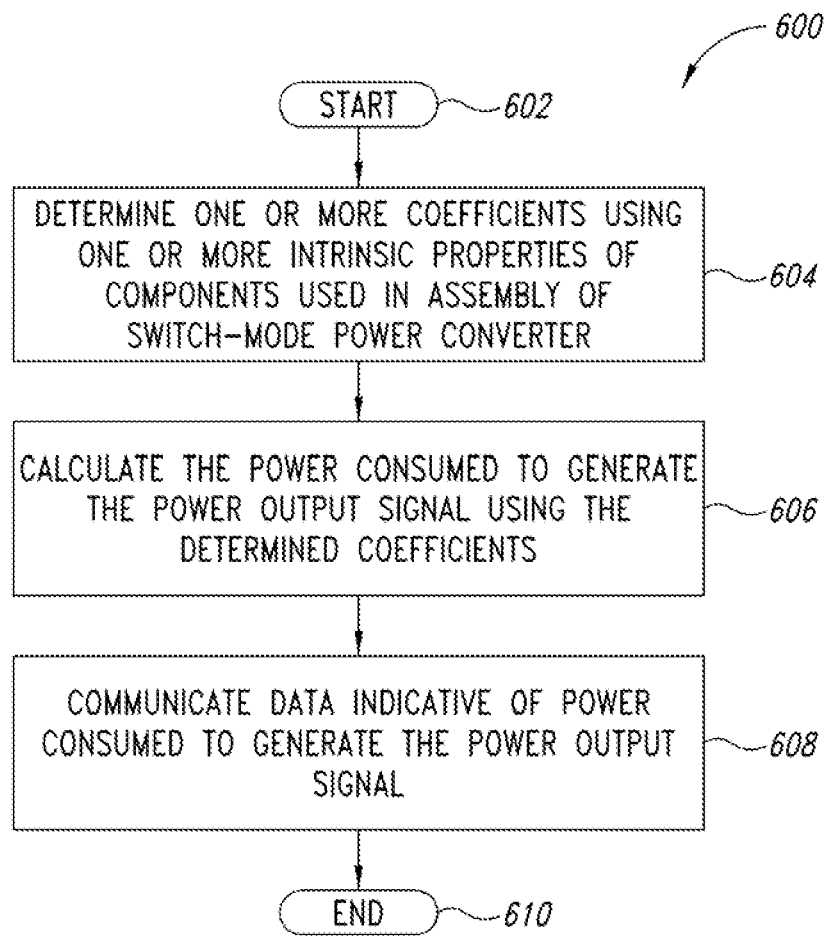
FIG. 6 is a logic flow diagram showing a high level method of determining an algorithm that relates power consumption of a switch-mode power converter and load to at least one of a converter drive circuit frequency or a converter drive circuit pulse width using one or more algorithm coefficients based on component values, according to one non-limiting illustrated embodiment.

FIG. 6 shows a high level method 600 of determining the power consumption algorithm for a switch-mode power converter 102 based on the intrinsic properties of the components used to construct the power converter. The switch-mode power converter 102 can include a number of "off the shelf" or standard electronic components, including but not limited to, semiconductor switches, diodes, transformers, inductors, capacitors, solid state lighting devices, and resistors. The power consumption of the switch-mode power converter 102 is a function of the individual power losses attributable to each of these components. Such component power consumption may be based on the construction, configuration and tolerances used by a particular component supplier or manufacturer. Thus, to the limit of the inherent manufacturing variability in each component, an approximation of the power consumption of the switch-mode power converter 102 can be made based upon the various components used in constructing the power converter 102. Such variability in individual component values makes possible the ability to estimate power consumption of the switch-mode power converter 102 to a level of about +/−20%; about +/−10%; or about +/−5% of the actual power consumed using a power consumption algorithm based only upon power converter component values. The method commences at 602, for example in response to a call from another routine or method.

At 604, one or more power consumption algorithm coefficients are determined using one or more inherent properties of the components used to construct the switch-mode power converter 102. Such will be described in the context of an illustrative example, with the understanding that such techniques may be expanded to cover any number of components or any type of switch-mode power converter 102. Generally, the power consumption algorithm for a switch-mode power converter 102 will be nonlinear in nature. For illustrative purposes, assume an LLC resonant switch-mode power converter 102 is used and the relationship between converter drive circuit frequency 134 and power consumption is quadratic in nature where the quadratic coefficients K1, K2 and K3 are determined by the inherent properties of the components used in constructing the power converter and f is the drive circuit frequency 134:

$$\text{Power Consumed} = K1(f^2) + K2(f) + K3$$

The coefficients (K1, K2, K3) will vary based upon, among other things, the inherent properties of the components used to construct the power converter. For example, assume three components (an inductor, a capacitor and a 16 element LED lighting subsystem) are supplied by three different suppliers A, B, and C. Further, assume that supplier A is the preferred supplier of all three components, but B and C serve as intermittent back-up suppliers when supplier A is unable to source the desired number of components. One method of calculating the power consumption algorithm is to determine coefficients K1, K2, and K3 based on the use of the preferred supplier's (i.e., supplier A) components and then determine component specific correction factors for each of the coefficients based upon substitution of other supplier's (i.e., suppliers B and C) components. Thus, coefficients for all possible component permutations may be determined in advance and the appropriate power consumption algorithm stored within the control subsystem 104 of each switch-mode power converter 102 based upon the components used to construct the power converter. In a similar manner other variables in the manufacturing or operational environment may be reflected in the coefficients K1, K2 and K3. For example, if one or more components in the switch-mode power converter 102 display an operational temperature dependency affecting the power consumption of the power converter, such may be reflected in the coefficients K1, K2 and K3

Once determined, the power consumption algorithm may be stored within the nontransitory storage media 320, stored in an alternate location in the control subsystem 104, or hard programmed (e.g., burned into a read only memory or saved in an electrically erasable programmable read only memory) in the microcontroller 310.

At 606 the power consumed by the switch-mode power converter 102 is determined using the drive signal pulse width 132 or frequency 134 and the power consumption algorithm determined at 604. In at least some instances, the power consumption may be determined by the microcontroller 310. In other instances, the power consumption may be determined by a network connected device, for example another luminaire 300 or a remote monitoring station. In yet other instances, the power consumption may be determined by a communicably coupled handheld or portable computing device. Such calculations may include transmission of the converter drive signal pulse width 132 or converter drive signal frequency 134 to the microcontroller 310, the network connected device, or the communicably coupled handheld or portable computing device.

In some instances, the determined power consumption for a luminaire may represent an instantaneous power consumption value (i.e., the power consumption at 7:34 PM on Saturday, Sep. 29, 2012) as determined at the time of acquisition of the converter drive signal pulse width 132 or converter drive signal frequency 134. In other instances, the determined power consumption for a luminaire may represent a time-weighted average power consumption value (i.e., the average power consumption between 7:00 PM and 8:00 PM on Saturday, Sep. 29, 2012) as determined by a number of acquired converter drive signal pulse widths 132 or converter drive signal frequencies 134. In yet other instances, the determined power consumption for a luminaire may include the date, time, and magnitude of the maximum and minimum power consumption values (i.e., the maximum power consumption began at between 5:45 PM (i.e., sunset) on Saturday, Sep. 29, 2012 and the minimum power consumption began at 6:45 AM (i.e., sunrise) on Sunday, Sep. 30, 2012).

At 608, the power consumption data and optional date and time data are communicated to one or more remote locations. In at least some instances, the microcontroller 310 can communicate the power consumption data and optional date and time data to one or more external devices via the communications interface 324. For example, the microcontroller 310 can communicate the power consumption data and optional date and time data to a communicably coupled handheld or portable electronic device via one or more wired or wireless signals. In another example, the microcontroller 310 can communicate the power consumption data and optional date and time data to one or more network devices such as a remote monitoring station or a second luminaire 300 via the communications interface 324. In at least some instances, the power consumption data may be encrypted or otherwise protected, for example via public/private key encryption, SSL encryption, or the like. The method concludes at 610.

Figure 7:
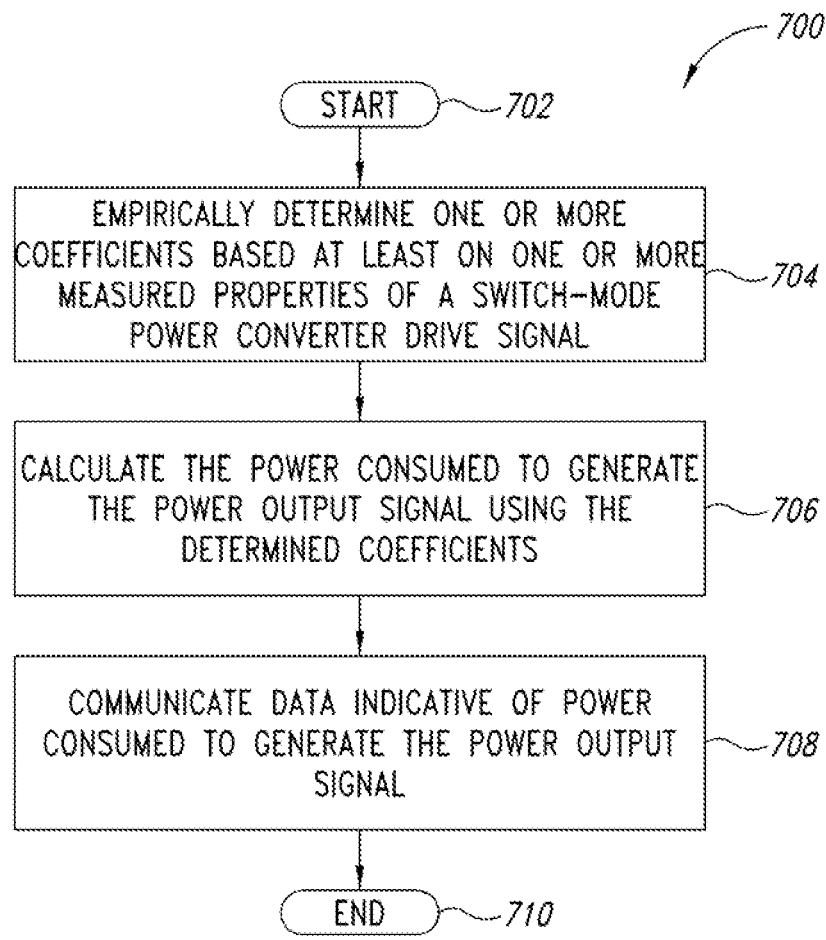
FIG. 7 is a logic flow diagram showing a high level method of determining an algorithm that relates power consumption of a switch-mode power converter and load to at least one of a converter drive circuit frequency or a converter drive circuit pulse width using one or more empirically determined algorithm coefficients, according to one non-limiting illustrated embodiment.

FIG. 7 shows a high level method 700 of determining the power consumption algorithm for a switch-mode power converter 102 based on an empirically determined power consumption algorithm that is specific to a given power converter. In some instances, a highly accurate determination of the power consumption of a switch-mode power converter 102 may be desirable. In such instances, the power consumption of a specific switch-mode power converter 102 can be empirically determined via bench-top or similar testing at a number of converter drive signal pulse widths 132 and a number of converter drive signal frequencies 134. The method commences at 702.

At 704, one or more power consumption algorithm coefficients are empirically determined via testing of the switch-mode power converter 102. For illustrative purposes, assume an LLC resonant switch-mode power converter is used. Testing at various converter drive signal pulse widths 132 and frequencies 134 can provide data indicating a quadratic relationship of the form Power Consumed=$K1(f^2)+K2(f)+K3$ exists between the converter drive signal frequency 134 and the power consumption of the switch-mode power converter 102. Applying regression analysis techniques on the acquired data can determine the coefficients K1, K2 and K3. Such techniques may permit the determination of a power consumption algorithm that is accurate to within about +/−10%; about +/−5%; about +/−2%; about +/−1%; or about +/−0.5%.

Once determined, the power consumption algorithm may be stored within the nontransitory storage media 324, stored in an alternate location in the control subsystem 104, or hard programmed (e.g., burned into a read only memory or saved in an electrically erasable programmable read only memory) in the microcontroller 310.

At 706 the power consumed by the switch-mode power converter 102 is determined using the drive signal pulse width 132 or frequency 134 and the power consumption algorithm determined at 704. In at least some instances, the power consumption may be determined by the microcontroller 310. In other instances, the power consumption may be determined by a network connected device, for example another luminaire 300 or a remote monitoring station. In yet other instances, the power consumption may be determined by a communicably coupled handheld or portable computing device. Such calculations may include transmission of the converter drive signal pulse width 132 or converter drive signal frequency 134 to the microcontroller 310, the network connected device, or the communicably coupled handheld or portable computing device.

In some instances, the determined power consumption for a luminaire may represent an instantaneous power consumption value (i.e., the power consumption at 7:34 PM on Saturday, Sep. 29, 2012) as determined at the time of acquisition of the converter drive signal pulse width 132 or converter drive signal frequency 134. In other instances, the determined power consumption for a luminaire may represent a time-weighted average power consumption value (i.e., the average power consumption between 7:00 PM and 8:00 PM on Saturday, Sep. 29, 2012) as determined by a number of acquired converter drive signal pulse widths 132 or converter drive signal frequencies 134. In yet other instances, the determined power consumption for a luminaire may include the date, time, and magnitude of the maximum and minimum power consumption values (i.e., the maximum power consumption began at between 5:45 PM (i.e., sunset) on Saturday, Sep. 29, 2012 and the minimum power consumption began at 6:45 AM (i.e., sunrise) on Sunday, Sep. 30, 2012).

At 708, the power consumption data and optional date and time data are communicated to one or more remote locations. In at least some instances, the microcontroller 310 can communicate the power consumption data and optional date and time data to one or more external devices via the communications interface 324. For example, the microcontroller 310 can communicate the power consumption data and optional date and time data to a communicably coupled handheld or portable electronic device via one or more wired or wireless signals. In another example, the microcontroller 310 can communicate the power consumption data and optional date and time data to one or more network devices such as a remote monitoring station or a second luminaire 300 via the communications interface 324. In at least some instances, the power consumption data may be encrypted or otherwise protected, for example via public/private key encryption, SSL encryption, or the like. The method concludes at 710.

Figure 8:
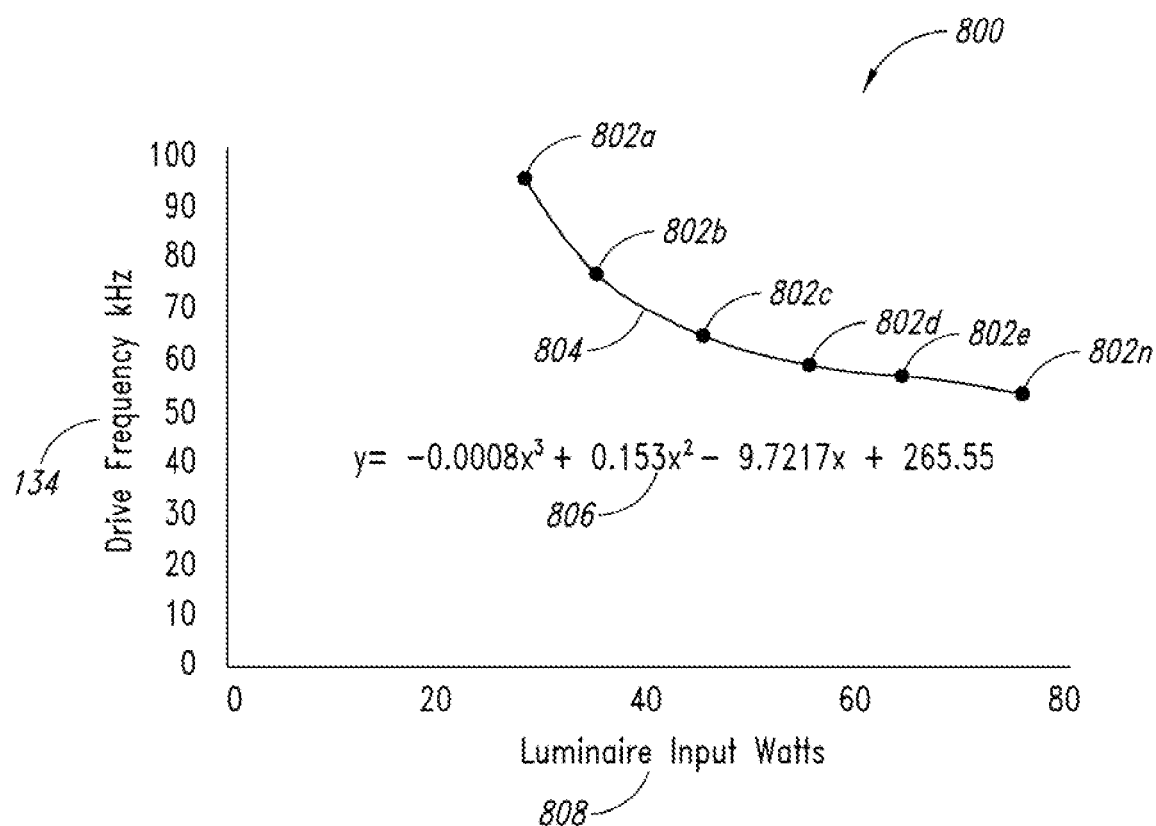
FIG. 8 is an illustrative example of an empirically determined third order polynomial relating the power consumption of a switch-mode power converter and load to the converter drive circuit frequency, according to one non-limiting illustrated embodiment.

FIG. 8 shows an illustrative example of an empirical power consumption algorithm 806 determined using a series of measured test points 802a-802n (collectively "test points 802") specific to a given switch-mode power converter 102. Testing of a switch-mode power converter 102 under conditions where the output power level of the power converter is measured as a function of at least one of the converter drive signal pulse width 132 or the converter drive signal frequency 134 provide a series of test points 802 through which a line (i.e., y=K*x) or second order or higher curve (i.e., $y=K_n*x^n + K_{n-1}*x^{n-1} + K_{n-2}*x^{n-2} + \ldots K_0$, where n=any positive integer value) 804 can be either autonomously or manually fitted and a corresponding empirical equation 806 approximating the line or curve 804 determined.

In the illustrative example shown in FIG. 8, a series of six (6) test points 802 relating the lighting subsystem 204 power input 808 (i.e., the switch-mode power converter 102 power output) to the converter drive circuit frequency 134 are shown. A curve 804 has been fitted to the test points 802 and a third order polynomial 806 approximating the curve 804 determined. The empirically determined third order polynomial 806 can be stored or otherwise retained within the control subsystem 104, for example in the nontransitory storage medium 320. Subsequently, the microcontroller 310 can determine the switch-mode power converter 102 power output at any converter drive signal frequency 134 via a single calculation using the third order polynomial.

Figure 9:
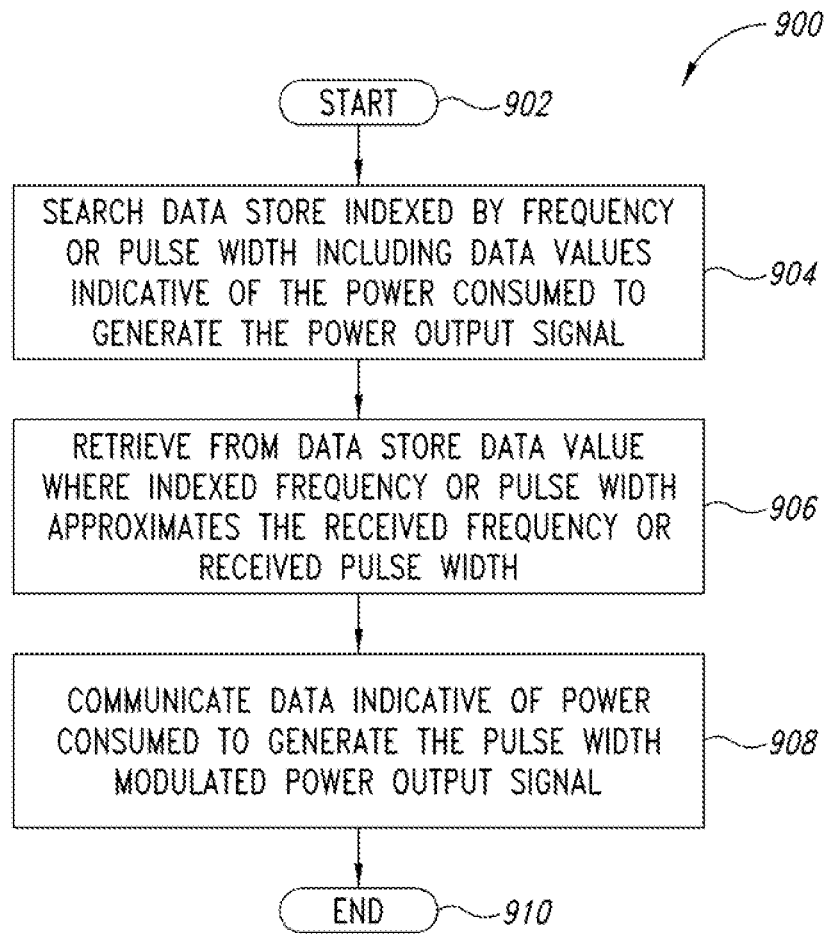
FIG. 9 is a logic flow diagram showing a high level method of determining the power consumption of a switch-mode power converter and load by performing a look-up or retrieval of a tabulated power consumption value based on at least one of a converter drive circuit frequency or a converter drive circuit pulse width, according to one non-limiting illustrated embodiment.

FIG. 9 shows a high level method 900 of determining the power consumption for a switch-mode power converter 102 using tabulated look-up data stored in a data store. The data store may be at least partially stored in the local nontransitory storage media 324 within the luminaire 300. In some instances, the data store used to determine the power consumption of the switch-mode power converter 102 may be at least partially stored in a remote location such as a remote monitoring workstation. In other instances, the data store used to determine the power consumption of the switch-mode power converter 102 may be in a handheld or portable electronic device that is communicably coupled to the luminaire 300. The data store may include tabulated or compiled data that has been either empirically determined or calculated based on one or more component values in the switch-mode power converter 102. In at least some instances, the data contained in the data store may be indexed by the converter drive signal pulse width 132, the converter drive signal frequency 134, or both the converter drive signal pulse width 132 and frequency 134. In at least some instances, instead of discrete values, one or more lines or curves 804 may be stored or otherwise retained in the control subsystem 104 and the power output of the switch-mode power converter 102 determined via an interpolative process performed by the microcontroller 310 on the one or more stored lines or curves 804. The method commences at 802, for example in response to a call from another routine or method.

At 904, either or both the converter drive signal pulse width 132 and the PWM drive signal frequency 134 are obtained. Such may be obtained either directly from the output signal 136 communicated from the microcontroller 310 to the converter drive controller 128 or directly via one or more transmitters or outputs on the converter drive controller 128. Using the communicated converter drive signal pulse width 132 or frequency 134, the power consumption of the switch-mode power converter 102 can be retrieved from the data store.

Since only a finite number of power consumption values can be reasonably maintained within the data store, the communicated converter drive signal pulse width 132 or frequency 134 may not exactly match the indexed converter drive signal pulse widths 132 or frequencies 134 used in the data store. In such instances, the microcontroller 310 may apply one or more sets of instructions that result in rounding either upwards or downwards the actual converter drive signal pulse width 132 or frequency 134 to match a converter drive signal pulse width 132 or frequency 134 value used to index the power consumption data stored within the data store. In other instances, the microcontroller 310 may apply one or more sets of instructions to interpolate a power consumption value using the indexed drive signal pulse widths 132 or frequencies 134 based upon the actual converter drive signal pulse width 132 or frequency 134.

At 906, the power consumed by the switch-mode power converter 102 is retrieved from the data store using the indexed converter drive signal pulse width 132 or frequency 134. The data store may be at least partially stored in, and the power consumption data retrieved from, the local nontransitory storage media 324 within the luminaire 300. In some instances, the data store used to determine the power consumption of the switch-mode power converter 102 may be at least partially stored in, and the power consumption data retrieved from, a remote location such as a remote monitoring workstation. In other instances, the data store used to determine the power consumption of the switch-mode power converter 102 may be stored in, and the power consumption data retrieved from, a handheld or portable electronic device that is communicably coupled to the luminaire 300.

In some instances, the determined power consumption for a luminaire may represent an instantaneous power consumption value (i.e., the power consumption at 7:34 PM on Saturday, Sep. 29, 2012) as determined at the time of acquisition of the converter drive signal pulse width 132 or converter drive signal frequency 134. In other instances, the determined power consumption for a luminaire may represent a time-weighted average power consumption value (i.e., the average power consumption between 7:00 PM and 8:00 PM on Saturday, Sep. 29, 2012) as determined by a number of acquired converter drive signal pulse widths 132 or converter drive signal frequencies 134. In yet other instances, the determined power consumption for a luminaire may include the date, time, and magnitude of the maximum and minimum power consumption values (i.e., the maximum power consumption began at between 5:45 PM (i.e., sunset) on Saturday, Sep. 29, 2012 and the minimum power consumption began at 6:45 AM (i.e., sunrise) on Sunday, Sep. 30, 2012).

At 908, the power consumption data and optional date and time data are communicated to one or more remote locations. In at least some instances, the microcontroller 310 can communicate the power consumption data and optional date and time data to one or more external devices via the communications interface 324. For example, the microcontroller 310 can communicate the power consumption data and optional date and time data to a communicably coupled handheld or portable electronic device via one or more wired or wireless signals. In another example, the microcontroller 310 can communicate the power consumption data and optional date and time data to one or more network devices such as a remote monitoring station or a second luminaire 300 via the communications interface 324. In at least some instances, the power consumption data may be encrypted or otherwise protected, for example via public/private key encryption, SSL encryption, or the like. The method concludes at 910.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure. For example, the control subsystem may include an analog electronic delay circuit such as a capacitor based timer circuit with defined delay times, to implement one or more of the specific adjustment times (e.g., times as indicated by the clock when light sources will be turned ON, decreased output, increased output, turned OFF).

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/052,924, filed May 13, 2008; U.S. Patent Publication No. US 2009/0284155, published Nov. 19, 2009; U.S. Provisional Patent Application No. 61/051,619, filed May 8, 2008; U.S. Pat. No. 8,118,456, issued Feb. 12, 2012; U.S. Provisional Patent Application No. 61/088,651, filed Aug. 13, 2008; U.S. Patent Publication No. US 2010/0090577, published Apr. 15, 2010; U.S. Provisional Patent Application No. 61/115,438, filed Nov. 17, 2008; U.S. Provisional Patent Application No. 61/154,619, filed Feb. 23, 2009; U.S. Patent Publication No. US2010/0123403, published May 20, 2010; U.S. Provisional Patent Application No. 61/174,913, filed May 1, 2009; U.S. Patent Publication No. US2010/0277082, published Nov. 4, 2010; U.S. Provisional Patent Application No. 61/180,017, filed May 20, 2009; U.S. Patent Publication No. US2010/0295946, published Nov. 25, 2010; U.S. Provisional Patent Application No. 61/229,435, filed Jul. 29, 2009; U.S. Patent Publication No. US2011/0026264, published Feb. 3, 2011; U.S. Provisional Patent Application No. 61/295,519 filed Jan. 15, 2010; U.S. Provisional Patent Application No. 61/406,490 filed Oct. 25 2010; U.S. Patent Publication No. US2011/0175518, published Jul. 21, 2011; U.S. Provisional Patent Application Ser. No. 61/333,983, filed May 12, 2010; U.S. Patent Publication No. US2010/0295454, published Nov. 25, 2010; U.S. Provisional Patent Application Ser. No. 61/346,263, filed May 19, 2010, U.S. Patent Publication No. US2010/0295455, published Nov. 25, 2010; U.S. Provisional Patent Application Ser. No. 61/357,421, filed Jun. 22, 2010; U.S. Patent Publication No. US2011/0310605, published Dec. 22, 2011; U.S. Patent Publication No. 2012/0262069, published Oct. 18, 2012; U.S. Non-Provisional patent application Ser. No. 13/212,074, filed Aug. 17, 2011; U.S. Provisional Patent Application Ser. No. 61/527,029, filed Aug. 24, 2011; U.S. Non-Provisional patent application Ser. No. 13/592,590 filed Aug. 23, 2012; U.S. Provisional Patent Application Ser. No. 61/534,722, filed Sep. 14, 2011; U.S. Non-Provisional patent application Ser. No. 13/619,085, filed Sep. 14, 2012; U.S. Provisional Patent Application Ser. No. 61/567,308, filed Dec. 6, 2011; U.S. Provisional Patent Application Ser. No. 61/561,616, filed Nov. 18, 2011; U.S. Provisional Patent Application Ser. No. 61/641,781, filed May 2, 2012; U.S. Non-Provisional patent application Ser. No. 13/411,321 filed Mar. 2, 2012; U.S. Provisional Patent Application Ser. No. 61/640,963, filed May 1, 2012; U.S. Non-Provisional patent application Ser. No. 13/558,191 filed Jul. 25, 2012; U.S. Provisional Patent Application Ser. No. 61/692,619, filed Aug. 23, 2012; U.S. Provisional Patent Application Ser. No. 61/694,159, filed Aug. 28, 2012; U.S. Non-Provisional patent application Ser. No. 13/604,327 filed Sep. 5, 2012; and are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power monitoring system, comprising:
   a power subsystem including:
      at least one switch-mode power converter including at least one power converter drive circuit, the switch-mode power converter electrically conductively coupled to provide an adjustable level power output to at least one solid state lighting subsystem and the power converter drive circuit to adjust the power output level of the switch-mode power supply to the at least one solid state lighting subsystem based on at least one of: a converter drive signal frequency or a converter drive signal pulse width; and
   a control subsystem communicably coupled to the power converter drive circuit, the control subsystem including: at least one controller that determines at least an approximation of the power consumed by the power subsystem to generate the power output to the at least one solid state lighting subsystem based at least in part on at least one of: information indicative of the converter drive signal frequency or information indicative of the converter drive signal pulse width.

2. The power monitoring system of claim 1 wherein the at least one controller further generates and communicates to the power converter drive circuit a signal including the information indicative of at least one of: the converter drive signal frequency or the converter drive signal pulse width, and the determination by the at least one controller of at least an approximation of the power consumed by the power subsystem is based at least in part on the information indicative of at least one of: the converter drive signal frequency or the converter drive signal pulse width communicated by the at least one controller to the at least one switch-mode power converter.

3. The power monitoring system of claim 1 wherein the at least one switch-mode power converter further comprises at least one output communicably coupled to the at least one controller, the at least one output to communicate from the switch-mode power converter to the at least one controller an output signal including information indicative of at least one of: the converter drive signal frequency or the converter drive signal pulse width, and the determination by the at least one controller of at least an approximation of the power consumed by the power subsystem is based at least in part on the information indicative of at least one of: the converter drive signal frequency or the converter drive signal pulse width communicated by the at least one switch-mode power converter to the at least one controller.

4. The power monitoring system of claim 1, further comprising:
   a housing disposed at least partially about the power subsystem and the control subsystem, wherein at least a portion of the at least one solid state lighting subsystem is disposed within the housing.

5. The power monitoring system of claim 1 wherein the control subsystem further comprises at least one nontransitory storage media communicably coupled to the at least one controller.

6. The power monitoring system of claim 1 wherein the control subsystem further comprises at least one environmental sensor communicably coupled to the at least one controller, and that provides sensor information indicative of at least one ambient environmental condition to the at least one controller.

7. The system of claim 1 wherein the at least one controller determines at least the approximation the power consumed by the power subsystem to generate the power output to the at least one solid state lighting subsystem via one or more analytical relationships, the one or more analytical relationships based at least in part on the information indicative of at least one of: the converter drive signal frequency or the converter drive signal pulse width.

8. The power monitoring system of claim 1 wherein the power subsystem includes an LLC resonant constant current converter, and the at least one controller determines at least the approximation of the power consumed by the power subsystem to generate the power output to the at least one solid state lighting subsystem based at least in part on the information indicative of the converter drive signal frequency.

9. The power monitoring system of claim 1 wherein the power subsystem includes a constant frequency flyback converter, and the at least one controller determines at least the approximation of the power consumed by the power subsystem to generate the power output to the at least one solid state lighting subsystem based at least in part on the information indicative of the converter drive signal pulse width.

10. The power monitoring system of claim 1 wherein the power subsystem includes a variable frequency flyback converter, and the at least one controller determines at least the approximation of the power consumed by the power subsystem to generate the power output to the at least one solid state lighting subsystem based at least in part on the information indicative the converter drive signal frequency and the converter drive signal pulse width.

11. The power monitoring system of claim 1 wherein the control subsystem further includes at least one communications interface communicably coupled to the at least one controller, and the at least one controller further communicates to the at least one communications interface at least one output signal including information indicative of the power consumed by the power subsystem to generate the power output to the at least one solid state lighting subsystem.

12. The power monitoring system of claim 1 wherein the at least one controller further:
   compares information indicative of at least one of: the converter drive signal frequency or the converter drive signal pulse width with at least one defined alert threshold stored in a nontransitory storage media communicably coupled to the at least one controller; and
   communicates to the at least one communications interface a signal including information indicative of an alert condition when at least one of: the converter drive signal frequency or the converter drive signal pulse width falls outside the at least one defined alert threshold.

13. The power monitoring system of claim 1 wherein the at least one controller further:
   detects a power converter drive circuit fault condition based at least in part on at least one of: information indicative of the converter drive signal frequency or information indicative of the converter drive signal pulse width; and responsive to detecting the power converter drive circuit fault condition, generates at least one of: a visual fault condition indicator or a fault condition signal, and stores data indicative of the detected fault condition in a communicably coupled nontransitory storage media.

14. A method to determine the power consumed by a power subsystem including a switch-mode power converter and a power converter drive circuit, the switch-mode power converter electrically conductively coupled to a solid-state lighting subsystem to provide an adjustable level power output to the solid state lighting subsystem based on at least one of: a pulse width modulated signal frequency or a pulse width modulated signal pulse width, the method comprising:
determining by at least one controller communicably coupled to at least the power converter drive circuit at least an approximation of the power consumed by the power subsystem to generate the power output to the at least one solid state lighting subsystem based on information indicative of at least one of: the converter drive signal frequency or the converter drive signal pulse width.

15. The method of claim 14, further comprising:
acquiring by the at least one controller the information indicative of at least one of: the converter drive signal frequency or the converter drive signal pulse width based at least in part on one or more signals communicated by the at least one controller to the power converter drive circuit.

16. The method of claim 14, further comprising:
acquiring by the at least one controller the information indicative of at least one of: the converter drive signal frequency or the converter drive signal pulse width based at least in part on one or more output signals communicated by the power converter drive circuit to the at least one controller.

17. The method of claim 14, further comprising:
comparing by the at least one controller the information indicative of at least one of: the converter drive signal frequency or the converter drive signal pulse width with at least one defined alert threshold stored in a nontransitory storage media communicably coupled to the at least one controller.

18. The method of claim 17, further comprising:
communicating via at least one communications interface communicably coupled to the controller at least one alert signal including the information indicative of at least one of: the converter drive signal frequency or the converter drive signal pulse width when at least one of: the respective converter drive signal frequency or the respective converter drive signal pulse width falls outside the at least one defined alert threshold.

19. The method of claim 14, further comprising:
communicating via at least one communications interface communicably coupled to the controller, a power consumption signal including information indicative of at least the approximation of the power consumed by the power subsystem to generate the power output to the at least one solid state lighting subsystem.

20. The method of claim 14 wherein determining the approximation of the power consumed by the power subsystem to generate the power output to the at least one solid state lighting subsystem, includes:
calculating using one or more analytical relationships at least the approximation of the power consumed to generate the power output to the at least one solid state lighting subsystem based at least in part on the information indicative of at least one of: the converter drive signal frequency or the converter drive signal pulse width.

21. The method of claim 20 wherein calculating using one or more analytical relationships at least the approximation of the power consumed to generate the power output to the at least one solid state lighting subsystem based at least in part on the information indicative of the converter drive signal frequency or the converter drive signal pulse width, includes:
determining by the at least one controller one or more coefficients based at least on a number of intrinsic properties of at least one component in the power converter drive circuit; and
determining at least the approximation of the power consumed to generate the power output to the at least one solid state lighting subsystem using the one or more analytical relationships, the one or more determined coefficients, and the information indicative of at least one of: the converter drive signal frequency or the converter drive signal pulse width.

22. The method of claim 20 wherein calculating using one or more analytical relationships at least the approximation of the power consumed to generate the power output to the at least one solid state lighting subsystem based at least in part on the information indicative of the converter drive signal frequency or the converter drive signal pulse width, includes:
retrieving by the at least one controller one or more coefficients from a communicably coupled nontransitory storage medium; and
determining at least the approximation of the power consumed to generate the power output to the at least one solid state lighting subsystem using one or more analytical relationships, the one or more retrieved coefficients, and at least one of: the converter drive signal frequency or the converter drive signal pulse width.

23. The method of claim 20 wherein calculating using one or more analytical relationships at least the approximation of the power consumed to generate the power output to the at least one solid state lighting subsystem based at least in part on the information indicative of the converter drive signal frequency or the converter drive signal pulse width, includes:
searching by the at least one controller a data store in a communicably coupled nontransitory storage medium, the data store including data values indicative of the approximation of the power consumed to generate the power output to the at least one solid state lighting subsystem, the data store indexed by at least one of a plurality of converter drive signal frequencies or a plurality of converter drive signal pulse widths; and
retrieving by the at least one controller from the nontransitory storage medium a data value indicative of the approximation of the power consumed to generate the power output to the at least one solid state lighting subsystem, wherein the retrieved value is selected by the at least one controller based on at least one of: the information indicative of the converter drive signal frequency approximates an indexed converter drive signal frequency value in the data store or the information indicative of the converter drive signal pulse width approximates an indexed converter drive signal pulse width value in the data store.

24. A solid state lighting power monitoring system, comprising:
a solid state lighting subsystem including at least one solid state light source;

a power subsystem including:
- a switch-mode power converter electrically conductively coupled to provide a power output to the solid state lighting subsystem; and
- a pulse width modulated power converter drive circuit to adjust the power output of the switch-mode power supply to the solid state lighting subsystem, the power converter drive circuit includes at least one output to communicate information indicative of at least one of: a converter drive signal frequency or a converter drive signal pulse width; and a control subsystem communicably coupled to the power converter drive circuit output, at least one nontransitory storage medium, and a communications interface, the control subsystem including at least one controller that:
- receives from the power converter drive circuit output information indicative of at least one of the converter drive signal frequency or the converter drive signal pulse width; and
- determines an approximation of the power consumed to generate the power output to the at least one solid state lighting subsystem based at least in part on the received information indicative of at least one of: the converter drive signal frequency or the converter drive signal pulse width.

25. The solid state lighting power monitoring system of claim 24 wherein the control subsystem further comprises at least one environmental sensor communicably coupled to the at least one controller, and that provides sensor data indicative of at least one ambient environmental condition to the at least one controller.

26. The system of claim 24 wherein the at least one controller determines the approximation of the power consumed to generate the power output to the at least one solid state lighting subsystem via one or more analytical relationships and based at least in part on the received information indicative of at least one of: the converter drive signal frequency or the received information indicative of the converter drive signal pulse width.

27. The system of claim 24 wherein the power subsystem includes an LLC resonant constant current power converter, the power converter drive circuit generates an output signal that includes information indicative of the converter drive signal frequency, and the at least one controller determines the power consumed by the power subsystem to generate the power output signal based at least in part on the received information indicative of the converter drive signal frequency.

28. The system of claim 24 wherein the power subsystem includes a constant frequency flyback converter, the power converter drive circuit generates an output signal that includes information indicative of the converter drive signal pulse width, and the at least one controller determines the power consumed by the power subsystem to generate the power output signal based at least in part on the received information indicative of the converter drive signal pulse width.

29. The system of claim 24 wherein the power subsystem includes a variable frequency flyback converter, the power converter drive circuit generates an output signal that includes information indicative of converter drive signal frequency and the converter drive signal pulse width, and the at least one controller determines the power consumed by the power subsystem to generate the power output signal based at least in part on the received information indicative of the converter drive frequency and the converter drive signal pulse width.

30. The system of claim 24 wherein the at least one controller further:
- communicates to the communications interface at least signal including information indicative of the approximation of the power consumed to generate the power output to the at least one solid state lighting subsystem.

* * * * *